(12) United States Patent
Anderson et al.

(10) Patent No.: US 11,788,947 B2
(45) Date of Patent: Oct. 17, 2023

(54) SYSTEM AND METHOD FOR CONTROLLING DROPLET DISPENSING

(71) Applicant: INTEGRATED DNA TECHNOLOGIES, INC., Coralville, IA (US)

(72) Inventors: Keith Miller Anderson, Moss Beach, CA (US); Guillermo Alfredo Cornejo, Redwood City, CA (US)

(73) Assignee: INTEGRATED DNA TECHNOLOGIES, INC., Coralville, IA (US)

( * ) Notice: Subject to any disclaimer, the term of this patent is extended or adjusted under 35 U.S.C. 154(b) by 748 days.

(21) Appl. No.: 16/965,733

(22) PCT Filed: Jan. 31, 2019

(86) PCT No.: PCT/US2019/016186
§ 371 (c)(1),
(2) Date: Jul. 29, 2020

(87) PCT Pub. No.: WO2019/152740
PCT Pub. Date: Aug. 8, 2019

(65) Prior Publication Data
US 2021/0033519 A1 Feb. 4, 2021

Related U.S. Application Data

(60) Provisional application No. 62/624,565, filed on Jan. 31, 2018.

(51) Int. Cl.
*G01N 15/14* (2006.01)
*G01N 35/10* (2006.01)

(52) U.S. Cl.
CPC ..... *G01N 15/1434* (2013.01); *G01N 35/1016* (2013.01); *G01N 2015/1481* (2013.01)

(58) Field of Classification Search
CPC ........... G01N 15/1434; G01N 35/1016; G01N 2015/1481; G01N 2015/0294;
(Continued)

(56) References Cited

U.S. PATENT DOCUMENTS

2008/0184809 A1\* 8/2008 Shvets ................ G01F 15/0755
73/861
2010/0173394 A1 7/2010 Colston, Jr. et al.
(Continued)

FOREIGN PATENT DOCUMENTS

WO 2007/076549 A2 7/2007

OTHER PUBLICATIONS

International Search Report and Written Opinion for Application No. PCT/US2019/016186 dated May 29, 2019 (28 pages).

*Primary Examiner* — Donnell A Long
(74) *Attorney, Agent, or Firm* — Michael Best & Friedrich LLP

(57) ABSTRACT

Systems and methods for controlling volumes of droplets is provided herein. In some cases, the systems comprise: a plurality of first light sources, a second light source, wherein a first light beam emitted a first light source of said plurality of first light sources is configured to intersect with a second light beam emitted from said second light source at an intersection area, wherein said system is configured to measure a characteristic of said droplet as it passes through said intersection area. Systems and methods for measuring volumes of droplets and for distinguishing between bubbles and droplets are also provided.

24 Claims, 11 Drawing Sheets

(58) Field of Classification Search
CPC ... G01N 2015/1006; G01N 2015/1075; G01N 15/0205; G01N 2015/1493; G01N 2015/1497; G01N 15/1459; G01N 35/1011; G01N 2015/1406; G01N 2021/0131; G01N 2021/0137; B01L 2200/06

See application file for complete search history.

(56) References Cited

U.S. PATENT DOCUMENTS

| | | | |
|---|---|---|---|
| 2012/0154787 A1* | 6/2012 | Brady | G01N 15/1459 356/27 |
| 2015/0247789 A1 | 9/2015 | Kaduchak et al. | |
| 2016/0306367 A1* | 10/2016 | Dattner | G01N 21/85 |
| 2017/0137780 A1 | 5/2017 | Luscher et al. | |

* cited by examiner

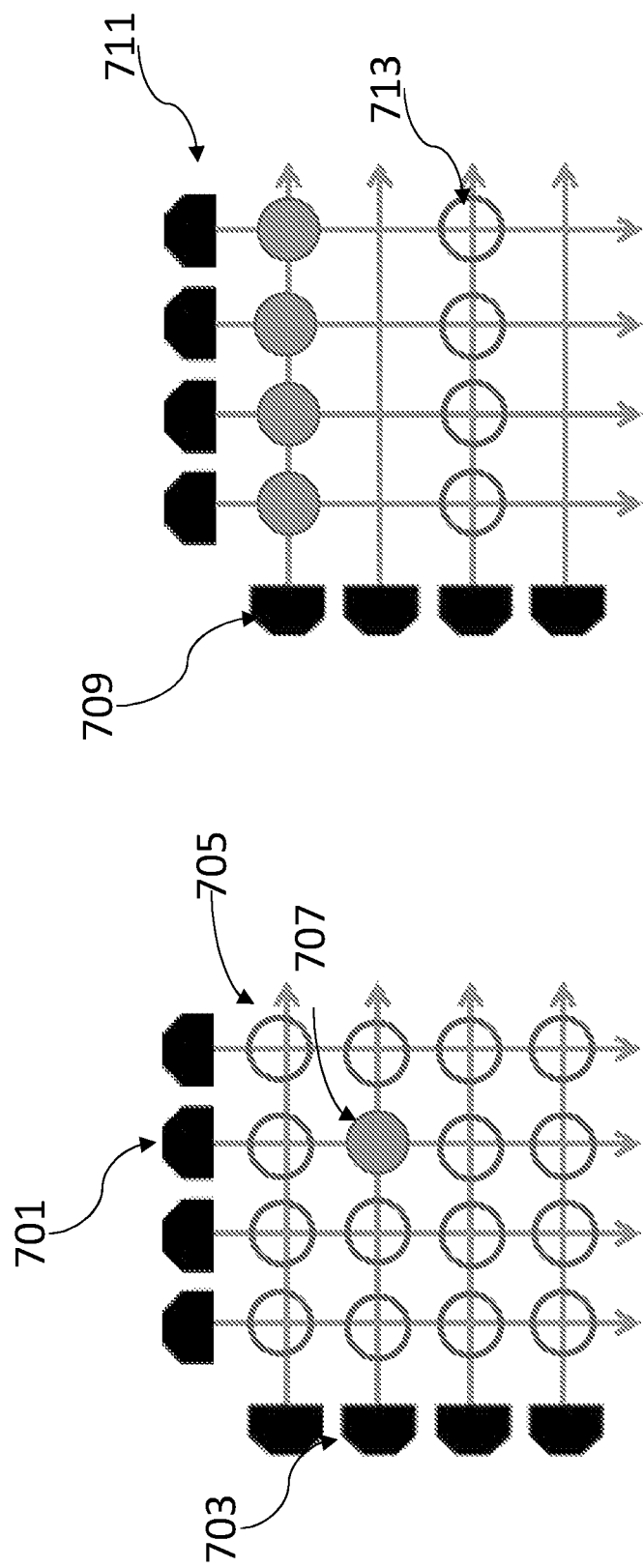

SYSTEM AND METHOD FOR CONTROLLING DROPLET DISPENSING

CROSS-REFERENCE TO RELATED APPLICATION(S)

This application is a U.S. national stage entry of International Patent Application No. PCT/US2019/016186, filed on Jan. 31, 2019, which claims the benefit of and priority to U.S. Provisional Patent Application No. 62/624,565, filed on Jan. 31, 2018, the entire contents of each of which are fully incorporated herein by reference.

STATEMENT AS TO FEDERALLY SPONSORED RESEARCH

This invention was made with the support of the United States government under Contract number HG006811 awarded by the National Human Genome Research Institute. The government has certain rights in the invention.

BACKGROUND OF THE INVENTION

Systems of dispensing droplets of small volumes are involved in a variety of biomedical fields, such as genome sequencing, diagnostics, pharmacogenomics, and forensics, etc. For example, in the sequencing field, arrays of drops of a biofluid or a reagent may be deposited to a substrate in the form of a biological assay for a synthesis reaction. The capability to control the dispensing system and to measure volumes accurately of small droplets is critical. Verification of each dispensation step is critical to ensuring synthesis quality, as any missing dispense would result in poor reaction yield (e.g., low purity oligonucleotide) or an oligonucleotide with synthesis or sequence errors. It has been estimated that, when utilizing low volume (<1 µL) dispensing systems, dispense failures may account for about 80% of the failed oligonucleotide sequences. Therefore, a need exists for an improved system for accurately measuring the volumes of small droplets, and for accurately controlling their dispensation.

SUMMARY OF THE INVENTION

In one aspect, a system for measuring a droplet is provided, the system comprising: (a) a plurality of first light sources; and (b) a second light source, wherein a first light beam emitted a first light source of the plurality of first light sources is configured to intersect with a second light beam emitted from the second light source at an intersection area, and wherein the system is configured to measure a characteristic of the droplet as it passes through the intersection area. In some cases, the system further comprises (c) a detector configured to detect a level of light from the first light beam. In some cases, the system further comprises (d) a detector configured to detect a level of light from the second light beam. In some cases, the plurality of first light sources are arranged in an array. In some cases, (b) further a plurality of second light sources. In some cases, the plurality of second light sources are arranged in an array. In some cases, each first light source of the plurality of first light sources is equidistant to each other. In some cases, each second light source of the plurality of second light sources is equidistant to each other. In some cases, the plurality of first light sources are stationary. In some cases, the second light source is configured to be moved along an axis. In some cases, the first light beam and the second light beam are configured to intersect at an intersection angle. In some cases, the intersection angle is about 90°. In some cases, the system further comprises (e) a plurality of dispensers configured to dispense a plurality of droplets therefrom along a droplet path. In some cases, the droplet path passes through the intersection area. In some cases, the plurality of dispensers are arranged in a one-dimensional array. In some cases, the plurality of dispensers are arranged in a two-dimensional array. In some cases, the plurality of dispensers are configured to dispense the plurality of droplets concurrently. In some cases, the plurality of dispensers are configured to dispense the plurality droplets sequentially. In some cases, the system further comprises (f) a processor operably coupled to the detector. In some cases, the processor is configured to analyze the level of light from the first light beam and the level of light from the second light beam. In some cases, the processor is configured to analyze: (i) an amount of light deflected from the first light beam as it passes through the intersection area; (ii) an amount of light deflected from the second light beam as it passes through the intersection area; or (iii) both. In some cases, the processor is configured to combine information related to a level of light received from a plurality of first light beams and a plurality of second light beams. In some cases, the detector is configured to detect the level of light of the first light beam and the level of light of the second light beam over a period of time. In some cases, the processor is configured to analyze the level of light from the first light beam and the level of light from the second light beam with respect to the period of time. In some cases, during the period of time, a plurality of droplets are dispensed from the plurality of dispensers. In some cases, the level of light from the first light beam and the level of light from the second light beam are dependent on a presence or absence of a droplet of the plurality of droplets at the intersection area at a given time point. In some cases, the processor is configured to determine a volume of a droplet. In some cases, the volume is determined based on the level of light from the first light beam and the level of light from the second light beam. In some cases, the volume is further determined based on a speed of the droplet in the intersection area. In some cases, the processor is configured to analyze a duration of time within which the level of light from the first light beam and the level of light from the second light beam are altered due to a presence of a droplet at the intersection area. In some cases, the processor is operably coupled to the plurality of dispensers. In some cases, the processor is configured to generate a feedback signal. In some cases, the processor controls a function of the plurality of dispensers based on the feedback signal. In some cases, the function of the plurality of dispensers comprises a rate at which a droplet is dispensed, a volume of a droplet dispensed therefrom, or both. In some cases, the feedback signal is determined based on a difference between a volume of the droplet dispensed from the plurality of dispensers and a desired volume of the droplet. In some cases, a bubble is detected based on the difference. In some cases, the characteristic of the droplet is selected from the group consisting of: a volume of the droplet, a shape of the droplet, a velocity of the droplet, and any combination thereof. In some cases, the system is configured to compensate for a missing droplet or an incorrect volume of a droplet based on the feedback signal. In some cases, the system further comprises (g) a substrate for receiving a droplet. In some cases, a dispenser of the plurality of dispensers is configured to deposit a droplet onto the substrate at a desired location. In some cases, the plurality of first light sources are configured to emit a plurality of first light beams concurrently. In some cases, the first light beam has a wavelength from about 700 nm to about 1 mm. In some cases, the second light beam has a wavelength from about 700 nm to about 1 mm. In some cases, the first light beam comprises a beam sheet. In some cases, the second light beam comprises a beam sheet. In some cases, the beam sheet has a rectangular shape or a square shape. In some cases, the beam sheet has a width in a range from about 10 μm to about 2500 μm. In some cases, the first light beam comprises a beam spot. In some cases, the second light beam comprises a beam spot. In some cases, a diameter of the beam spot is in a range from about 10 μm to about 2500 μm. In some cases, the intersection area is about 2 mm². In some cases, the plurality of first light sources and the second light source are contained within a housing. In some cases, the detector comprises a photo cell. In some cases, the system further comprises (h) an amplifier operably coupled to the detector. In some cases, the amplifier is configured to amplify a signal from the detector. In some cases, the system further comprises (i) an optical module configured to direct the first light beam and the second light beam to the detector. In some cases, the optical module comprises a reflector. In some cases, a first light source of the plurality of first light sources comprises a laser. In some cases, the second light source comprises a laser. In some cases, the system comprises a retroreflective laser device. In some cases, the system comprises a through laser device. In some cases, the system is configured to detect a presence of a droplet having a volume of 1 μL or less. In some cases, the system is configured to detect a presence of a droplet having a volume of 10 nL or less. In some cases, the droplet is a liquid droplet. In some cases, the droplet comprises a reagent or a solution. In some cases, the droplet comprises a reagent suitable for use in a polymer synthesis reaction. In some cases, the droplet comprises a biological material. In some cases, the biological material comprises a biological cell. In some cases, the system is configured to deposit from 1-1000 droplets onto the substrate in about 5 μs to about 1 s with an error rate of about 1-20%.

In another aspect, a system is provided comprising: (a) a first light source configured to emit a first light beam along a first axis; and (b) a second light source configured to emit a second light beam along a second axis, wherein the first axis and the second axis intersect at an intersection area, and wherein the system is capable of distinguishing between a droplet and a bubble when either is present at the intersection area.

In another aspect, a system is provided comprising: (a) a first light source configured to emit a first light beam along a first axis; and (b) a second light source configured to emit a second light beam along a second axis, wherein the first axis and the second axis intersect at an intersection area, and wherein the system is capable of identifying a presence of a droplet at the intersection area, wherein the droplet has a volume of 1 μL or less.

In some cases, any system of the preceding further comprise a detector configured to detect a level of light from the first light beam and a level of light from the second light beam. In some cases, the first light source of (a) further comprises a plurality of first light sources. In some cases, the plurality of first light sources are arranged in an array. In some cases, each first light source of the plurality of first light sources is equidistant to each other. In some cases, the second light source of (b) further comprises a plurality of second light sources. The system of claim 76, wherein the plurality of second light sources are arranged in an array. In some cases, the plurality of first light sources are stationary.

In some cases, the second light source is configured to be moved along an axis. In some cases, the first light beam and the second light beam are configured to intersect at an intersection angle. In some cases, the intersection angle is about 90°. In some cases, any system of the preceding further comprises (d) a plurality of dispensers each configured to dispense a plurality of droplets therefrom along a droplet path. In some cases, the droplet path passes through the intersection area. In some cases, the plurality of dispensers are arranged in a one-dimensional array. In some cases, the plurality of dispensers are arranged in a two-dimensional array. In some cases, the plurality of dispensers are configured to dispense the plurality of droplets concurrently. In some cases, the plurality of dispensers are configured to dispense the plurality of droplets sequentially. In some cases, any system of the preceding further comprises (e) a processor operably coupled to the detector. In some cases, the processor is configured to analyze the level of light from the first light beam and the level of light from the second light beam. In some cases, the processor is configured to analyze: (i) an amount of light deflected from the first light beam as it passes through the intersection area; (ii) an amount of light deflected from the second light beam as it passes through the intersection area; or (iii) both. In some cases, the processor is configured to combine information related to a level of light received from a plurality of first light beams and a plurality of the second light beams. In some cases, the detector is configured to detect the level of light of the first light beam and the level of light of the second light beam over a period of time. In some cases, the processor is configured to analyze the level of light from the first light beam and the level of light from the second light beam with respect to the period of time. In some cases, during the period of time, a plurality of droplets are dispensed from the plurality of dispensers. In some cases, the level of light from the first light beam and the level of light from the second light beam are dependent on a presence or absence of a droplet at the intersection area at a given time point. In some cases, the processor is configured to determine a volume of a droplet. In some cases, the volume is determined based on the level of light from the first light beam and the level of light from the second light beam. In some cases, the volume is further determined based on a speed of the droplet in the intersection area. In some cases, the processor is configured to analyze a duration of time within which the level of light from the first light beam and the level of light from the second light beam are altered due to a presence of a droplet at the intersection area. In some cases, the processor is operably coupled to the plurality of dispensers. In some cases, the processor is configured to generate a feedback signal. In some cases, the processor controls a function of the plurality of dispensers based on the feedback signal. In some cases, the function of the plurality of dispensers comprises a rate at which a droplet is dispensed, a volume of a droplet dispensed therefrom, or both. In some cases, the feedback signal is determined based on a difference between a volume of the droplet dispensed from the plurality of dispensers and a desired volume of the droplet. In some cases, a bubble is detected based on the difference. In some cases, the system is configured to compensate for a missing droplet or an incorrect volume of a droplet based on the feedback signal. In some cases, the system of any of the preceding further comprises (g) a substrate for receiving a droplet. In some cases, the plurality of dispensers are configured to deposit a droplet onto the substrate at a desired location. In some cases, the first light beam has a wavelength from about 700 nm to about 1 mm.

In some cases, the second light beam has a wavelength from about 700 nm to about 1 mm. In some cases, the first light beam comprises a beam sheet. In some cases, the second light beam comprises a beam sheet. In some cases, the beam sheet has a rectangular shape or a square shape. In some cases, the beam sheet has a width in a range from about 10 μm to about 2500 μm. In some cases, the first light beam comprises a beam spot. In some cases, the second light beam comprises a beam spot. In some cases, a diameter of the beam spot is in a range from about 10 μm to about 2500 μm. In some cases, the intersection area is about 2 mm$^2$. In some cases, the first light source and the second light source are contained within a housing. In some cases, the detector comprises a photo cell. In some cases, any system of the preceding further comprises (h) an amplifier operably coupled to the detector. In some cases, the amplifier is configured to amplify a signal from the detector. In some cases, any system of the preceding further comprises (i) an optical module configured to direct the first light beam and the second light beam to the detector. In some cases, the optical module comprises a reflector. In some cases, the first light source comprises a laser. In some cases, the second light source comprises a laser. In some cases, the system comprises a retroreflective laser device. In some cases, the system comprises a through laser device. In some cases, the system is configured to detect a presence of a droplet having a volume of 10 nL or less. In some cases, the droplet is a liquid droplet. In some cases, the droplet comprises a reagent or a solution. In some cases, the droplet comprises a reagent suitable for use in a polymer synthesis reaction. In some cases, the droplet comprises a biological material. In some cases, the biological material comprises a biological cell. In some cases, the system is configured to deposit 1-1000 droplets in about 5 μs to about 1 s with an error rate of about 1-20%. In some cases, a bubble is detected when an object at the intersection area has a volume less than a pre-determined threshold. In some cases, a bubble is detected when the level of light from the first beam and the level of light from the second beam have a pattern different from a pattern generated by a droplet. In some cases, a droplet is detected when an object at the intersection area has a volume of less than 1 μL.

In yet another aspect, a method is provided comprising: (a) actuating a dispenser, wherein the dispenser is configured to dispense a droplet onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, whether a droplet or a bubble is deposited onto the substrate at a given position. In some cases, the method further comprises, when a bubble is deposited onto the substrate at the given position, actuating a dispenser to deposit a droplet onto the substrate at the given position.

In yet another aspect, a method is provided comprising: (a) actuating a dispenser, wherein the dispenser is configured to dispense one or more droplets onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, whether a droplet is deposited onto the substrate at a given location, and wherein the droplet has a volume of about 1 μL or less. In some cases, the method further comprises when a droplet has not been deposited onto the substrate at the given location, actuating a dispenser to deposit a droplet onto the substrate at the given location.

In some cases, (b) further comprises emitting a plurality of first light beams from a plurality of first light sources. In some cases, (c) further comprises emitting a plurality of second light beams from a plurality of second light sources. In some cases, the method further comprises moving the second light source relative to the first light source. In some cases, the method further comprises moving the substrate relative to the dispenser. In some cases, the method further comprises moving the dispenser relative to the substrate. In some cases, the method further comprises a plurality of dispensers to dispense a plurality of droplets therefrom concurrently. In some cases, the method further comprises actuating a plurality of dispensers to dispense a plurality of droplets therefrom sequentially. In some cases, the method further comprises analyzing the level of light from the first light beam and the level of light from the second light beam. In some cases, the method further comprises analyzing: (i) an amount of light deflected from the first light beam as it passes through the intersection area; (ii) an amount of light deflected from the second light beam as it passes through the intersection area; or (iii) both. In some cases, the method further comprises combining information related to a level of light received from a plurality of first light beams and a plurality of second light beams. In some cases, the method further comprises detecting the level of light of the first light beam and the level of light of the second light beam over a period of time. In some cases, the method further comprises analyzing the level of light from the first light beam and the level of light from the second light beam with respect to the period of time. In some cases, the method further comprises determining a volume of a droplet. In some cases, the volume is determined by analyzing the level of light from the first light beam and the level of light from the second light beam. In some cases, the volume is determined by analyzing a speed of the droplet in the intersection area. In some cases, the method further comprises analyzing a duration of time within which the level of light from the first light beam and the level of light from the second light beam are altered due to a presence of a droplet at the intersection area. In some cases, the method further comprises generating a feedback signal. In some cases, the method further comprises controlling a function of the dispenser based on the feedback signal. In some cases, the function of the dispenser comprises a rate at which a droplet is dispensed, a volume of a droplet dispensed therefrom, or both. In some cases, the method further comprises generating the feedback signal based on a difference between a volume of the droplet dispensed from the dispenser and a desired volume of the droplet. In some cases, the method further comprises detecting a bubble based on the difference. In some cases, the method further comprises determining a characteristic of a droplet, wherein the characteristic is selected from the group consisting of: a volume of the droplet, a shape of the droplet, a velocity of the droplet, and any combination thereof. In some cases, the method further comprises compensating for a missing droplet or an incorrect volume of a droplet based on the feedback signal. In some cases, the method further comprises depositing a droplet onto the substrate at a desired location.

In another aspect, a system for measuring a biological element is provided, the system comprising: (a) a plurality of first light sources; and (b) a second light source, wherein a first light beam emitted a first light source of the plurality of first light sources is configured to intersect with a second light beam emitted from the second light source at an intersection area, wherein the system is configured to measure a characteristic of the biological element as it passes through the intersection area. In some cases, the biological element comprises a biological cell.

In another aspect, a method is provided comprising: (a) actuating a dispenser, wherein the dispenser is configured to dispense a biological element onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, a characteristic of the biological element. In some cases, the biological element comprises a biological cell.

In some aspects of the present disclosure, systems for controlling volumes of small dispensed droplets are provided. In practicing, a system as disclosed herein may comprise: (a) one or more dispensers, wherein each of the one or more dispensers is configured to dispense one or more droplets therefrom such that when the one or more droplets are dispensed from the one or more dispensers, the one or more droplets move along one or more droplet paths; (b) a plurality of first light sources arranged on a first axis, each of the plurality of first light sources configured to provide a first light beam, wherein the first light beam intersects a droplet path of the one or more droplet paths at a first angle; (c) a plurality of second light sources arranged on a second axis, each of the plurality of second light sources configured to provide a second light beam, wherein the second light beam intersects a droplet path of the one or more droplet paths at a second angle, wherein a first light beam of the plurality of first light beams and a second light beam of the plurality of second light beams intersect the droplet path at an intersection area; (d) a plurality of first detectors, each configured to detect a level of light received from the plurality of first light sources; (e) a plurality of second detectors, each configured to detect a level of light received from the plurality of second light sources; and (f) one or more processors, operably coupled to the plurality of first detectors and the plurality of second detectors, wherein the one or more processors are configured to analyze the level of light received from the plurality of first light sources and the level of light received from the plurality of second light sources. In some cases, a system is capable of identifying the presence of a droplet with a volume of 10 nL or less at the intersection area.

In some aspects of the disclosure, systems for detecting bubbles from droplets are provided. A system as disclosed herein may comprise: (a) a dispenser, wherein the dispenser is configured to dispense one or more droplets therefrom such that when the one or more droplets are dispensed from the dispenser, the one or more droplets move along a droplet path; (b) a first light source configured to provide a first light beam from a first direction, wherein the first light beam intersects the droplet path at a first angle; (c) a second light source configured to provide a second light beam from a second direction, wherein the second light beam intersects the droplet path at a second angle; wherein the first light beam and second light beam intersect the droplet path at an intersection area; (d) a detector configured to detect a level of light received from the first light source; (e) a detector configured to detect a level of light received from the second light source; and (f) a processor, operably coupled to the first and second detectors, wherein the processor is configured to analyze the level of light received from the first light source and the level of light received from the second light source, wherein the system is capable of distinguishing between a droplet and a bubble at the intersection area.

In some aspects of the present disclosure, systems for automatic control of droplet volumes based on feedback signals are provided. A system as disclosed herein may comprise: (a) a dispenser, wherein the dispenser is configured to dispense one or more droplets therefrom such that when the one or more droplets are dispensed from the dispenser, the one or more droplets move along a droplet path; (b) a first light source configured to provide a first light beam from a first direction, wherein the first light beam intersects the droplet path at a first angle; (c) a second light source configured to provide a second light beam from a second direction, wherein the second light beam intersects the droplet path at a second angle; wherein the first light beam and the second light beam intersect the droplet path at an intersection area; (d) a detector configured to detect a level of light received from the first light source; (e) a detector configured to detect a level of light received from the second light source; (f) a processor, operably coupled to the first and second detectors, wherein the processor is configured to analyze the level of light received from the first light source and the level of light received from the second light source, and (g) one or more controllers, operably coupled to the one or more dispensers, and configured to receive information from the processor, wherein the one or more controllers are further configured to control a function of the one or more dispensers based on the level of light received from the first light source and the level of light received from the second light source.

In some aspects, the present disclosure provides methods for automatic control of small droplet volumes based on sensor-detected feedback signals are provided. A method as disclosed herein may comprise: (a) actuating a dispenser, wherein the dispenser is configured to dispense one or more droplets therefrom such that when the one or more droplets are dispensed from the dispenser, the one or more droplets move along a droplet path; (b) providing a first light source comprising a first light beam from a first direction, wherein the first light beam intersects the droplet path at a first angle; (c) providing a second light source comprising a second light beam from a second direction, wherein the second light beam intersects the droplet path at a second angle; wherein the first light beam and the second light beam intersect the droplet path at an intersection area; (d) detecting a level of light from the first and second light sources that passes through the intersection area; and (e) controlling a function of the dispenser based on the detecting.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Some novel features of the invention are set forth in the appended claims. A better understanding of the features and advantages of the present invention will be obtained by reference to the following detailed description that sets forth illustrative embodiments, in which the principles of the invention are utilized, and the accompanying drawings of which:

FIG. 7A and FIG. 7B illustrate non-limiting examples of droplets dispensed concurrently or sequentially, in accordance with the present disclosure.

DETAILED DESCRIPTION OF THE INVENTION

Figure 1A:
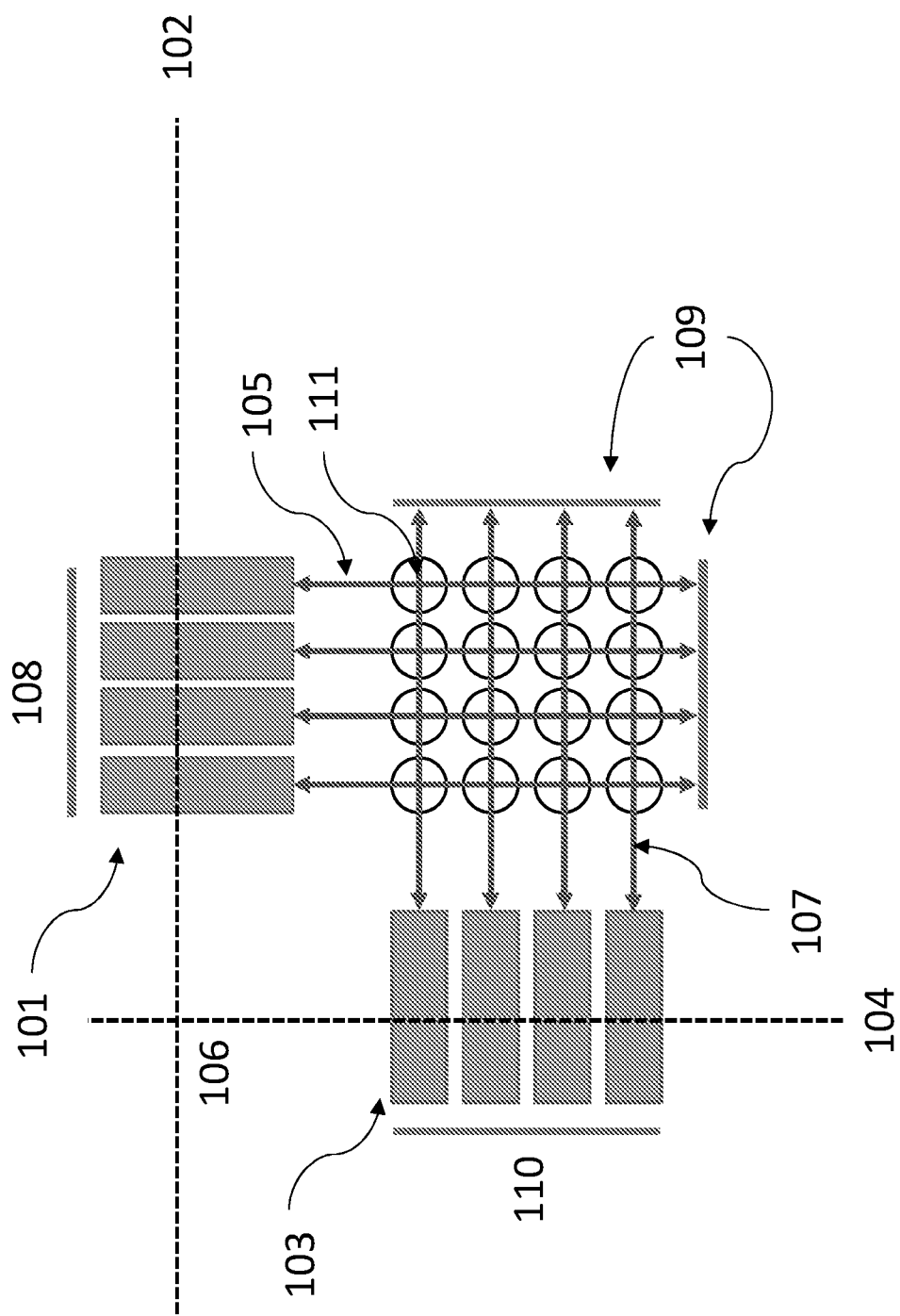
FIG. 1A, FIG. 1B, and FIG. 1C illustrate non-limiting examples of various laser based detection mechanisms, in accordance with the present disclosure.

While preferable embodiments of the disclosure have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the invention described herein may be employed in practicing the invention.

Disclosed herein are systems and methods for accurately measuring the volume of and for controlling the dispensing of droplets. In some cases, the systems and methods may be used to dispense or deposit droplets onto a substrate, such as, but not limited to, a substrate for biopolymer synthesis. In some cases, the systems and methods may be used to determine whether a droplet has been deposited onto a specific location of a substrate. In some cases, the systems and methods may be used to determine whether a desired volume of a fluid (e.g., a reagent) has been deposited onto a substrate. In some cases, the systems and methods may be used to determine that an undesired and/or inaccurate volume of a fluid has been deposited onto a substrate. In such cases, the methods and systems may be used to re-dispense a droplet of fluid or to otherwise correct the volume of the fluid deposited onto the substrate. In some cases, the systems and methods may be used to detect the presence of a bubble within a fluid stream. In some cases, the systems and methods may be used to detect a missing droplet in a fluid stream. In some cases, the systems and methods may automatically compensate for the missing volume of liquid based on a detected volume of the droplets.

In some cases, systems and methods are provided for dispensing droplets onto a substrate with accurately controlled volumes. The systems and methods may be used in various applications where small volume liquid handling is desired, including, but not limited to, genome sequencing, polymer synthesis, combinatorial synthesis, oligonucleotide synthesis, non-oligonucleotide synthesis (e.g., peptide synthesis, carbohydrate synthesis, and the like). In some aspects, the present disclosure provides systems and methods for controlling the volume of droplets dispensed in a drop-wise fashion. In some examples, the systems and methods may be used for controlling the volume of droplets dispensed in a drop-wise fashion with lower cost and higher accuracy than traditional systems. In particular, though not exclusively, the present disclosure provides systems and methods for measuring and controlling volumes of droplets that may be used in the biomedical field or the life sciences field.

Generally, the droplet may be a liquid droplet. In some cases, the droplet may include any fluid, reagent, or solution. In particular cases, but not exclusively, the droplet may include any fluid, reagent, or solution suitable to be used in an oligonucleotide synthesis reaction. Non-limiting examples of reagents that may be used in oligonucleotide synthesis reactions include: DNA phosphoramidites, RNA phosphoramidites, LNA phosphoramidites, linkers (e.g., amino linkers), dyes, labels, activator reagents, capping reagents, oxidizing reagents, cleavage reagents, solvents, purification reagents, desalting reagents, modification reagents, deblocking reagents, detritilyzation reagents, and the like. In some cases, the droplets described herein may include a plurality of reagents dissolved or suspended in a liquid form. The droplet may include a plurality of reagents with different mechanical properties, e.g., viscosity, refractive index, and the like. In some cases, a droplet may include a biological material or a biological element. In some cases, a droplet may comprise a biological cell (e.g., a droplet encapsulating a cell). In other cases, the system may be adapted to detect the presence of a individual biological cell (e.g., not encapsulated within a droplet). In some cases, the droplet may be transparent. Droplets may have a wide variety of shapes, such as, but not limited to: disc shaped, slug shaped, truncated sphere, ellipsoid, spherical, partially compressed sphere, hemispherical, ovoid, cylindrical, and other shapes formed during droplet operations, such as by merging or splitting or formed as a result of contact of such shapes with one or more surfaces of a droplet nozzle.

In some cases, the volume of a droplet may be in a range from about 1 nL to about 500 µL. For example, the volume of a droplet may be about 1 nL, about 5 nL, about 10 nL, about 15 nL, about 20 nL, about 25 nL, about 30 nL, about 35 nL, about 40 nL, about 45 nL, about 50 nL, about 55 nL, about 60 nL, about 65 nL, about 70 nL, about 75 nL, about 80 nL, about 85 nL, about 90 nL, about 95 nL, about 100 nL, about 150 nL, about 200 nL, about 250 nL, about 300 nL, about 350 nL, about 400 nL, about 450 nL, about 500 nL, about 550 nL, about 600 nL, about 650 nL, about 700 nL, about 750 nL, about 800 nL, about 850 nL, about 900 nL, about 950 nL, about 1 µL, about 10 µL, about 20 µL, about 30 µL, about 40 µL, about 50 µL, about 60 µL, about 70 µL, about 80 µL, about 90 µL, about 100 µL, about 150 µL, about 200 µL, about 250 µL, about 300 µL, about 350 µL, about 400 µL, about 450 µL, or about 500 µL. In some cases, the droplet volumes may be greater than about 500 µL. In some cases, the droplet volumes may be less than about 1 nL. In some cases, the droplet volumes may be controlled and measured by the systems and methods disclosed herein (e.g., using compatible detectors).

In some cases, the droplets may have a diameter in a range from about 10 µm to about 5000 µm. For example, the droplets may have a diameter of about 10 µm, about 20 µm, about 30 µm, about 40 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 1000 µm, about 1100 µm, about 1200 µm, about 1300 µm, about 1400 µm, about 1500 µm, about 1600 µm, about 1700 µm, about 1800 µm, about 1900 µm, about 2000 µm, about 2100 µm, about 2200 µm, about 2300 µm, about 2400 µm, about 2500 µm, about 2600 µm, about 2700 µm, about 2800 µm, about 2900 µm, about 3000 µm, about 3100 µm, about 3200 µm, about 3300 µm, about 3400 µm, about 3500 µm, about 3600 µm, about 3700 µm, about 3800 µm, about 3900 µm, about 4000 µm, about 4100 µm, about 4200 µm, about 4300 µm, about 4400 µm, about 4500 µm, about 4600 µm, about 4700 µm, about 4800 µm, about 4900 µm, or about 5000 µm. In some cases, the droplets may have a diameter of less than about 10 µm. In some cases, the droplets may have a diameter of greater than about 5000 µm.

In some aspects, the volume and/or the diameter of an individual droplet may be controlled or determined by one or more parameters of the dispensing system, such as, but not limited to, pressure for dispensing the droplet, valve activation duration, size of dispensing nozzles, and the like. In some cases, the volume and/or the diameter of the droplet may correspond to an amount of time during which the droplet passes through an intersection area. In some cases, a transparent or substantially transparent droplet having a small volume (e.g., <1 µL) may be detected by the systems and methods disclosed herein.

Generally, there are a variety of techniques that may be used for detecting and measuring volumes of droplets. Among the various detection schemes, optical systems may be widely used. However, optical systems using CCD or CMOS sensors cannot focus simultaneously on multiple objects in different focal planes without driving up the cost and complexity. Additionally, optical systems may require large computations for image processing which may not meet the requirements in situations where fast speed or high dispensing frequency is desired. Droplet sizes may also be measured using laser diffraction. In such cases, a laser beam may be passed through the droplet and the amount of laser light scattered may be measured. By comparing the amount of scattered light with the amount of unscattered light, the proportion of droplets in each size may be measured. However, these devices may have limitations in terms of the size of droplets that may be measured. For example, if the droplets are too small, there may be insufficient light refracted to generate reliable detection results.

In various aspects, the disclosure herein provides laser-based systems to measure volumes of small droplets with high accuracy. In some cases, the volume of a plurality of small droplets may be measured at different positions along a droplet path with high accuracy. In some cases, the methods and systems provided herein may be capable of achieving real-time measurement and control of droplet volumes.

According to some aspects of the invention, systems for real-time measuring and control of liquid droplets volumes are provided. In some aspects, a system for measuring a droplet is provided, the system comprising: (a) a plurality of first light sources; and (b) a second light source, wherein a first light beam emitted a first light source of the plurality of first light sources is configured to intersect with a second light beam emitted from the second light source at an intersection area, wherein the system is configured to measure a characteristic of the droplet as it passes through the intersection area.

In another aspect, a system is provided comprising: (a) a first light source configured to emit a first light beam along a first axis; and (b) a second light source configured to emit a second light beam along a second axis, wherein the first axis and the second axis intersect at an intersection area, and wherein the system is capable of distinguishing between a droplet and a bubble when either is present at the intersection area.

In another aspect, a system is provided comprising: (a) a first light source configured to emit a first light beam along a first axis; and (b) a second light source configured to emit a second light beam along a second axis, wherein the first axis and the second axis intersect at an intersection area, and wherein the system is capable of identifying a presence of a droplet at the intersection area, and wherein the droplet has a volume of 1 µL or less.

In some cases, a system may include one or more light sources. In some cases, a system may include a plurality of light sources. In some cases, a system may include a first light source and a second light source. In some cases, a system may include a plurality of first light sources and a plurality of second light sources. In some cases, a system may include one or more first light sources and one or more second light sources. In some cases, a system may include a plurality of first light sources, and one or more second light sources. In some aspects, a system may include a plurality of first light sources and a plurality of second light sources, each arranged in an array. In other aspects, a system of the disclosure may include a plurality of first light sources arranged in an array, and one or more second light sources. In such cases, the plurality of first light sources may be stationary, and the one or more second light sources may be movable relative to the plurality of first light sources. In some cases, one or more first light sources may be arranged along a first axis. In some cases, one or more second light sources may be arranged along a second axis. In some cases, the first axis and the second axis may intersect at an intersection angle. In some cases, the intersection angle may be about 90°. Alternatively, in some cases, the first axis and the second axis may intersect at an intersection angle of less than 90°, or at an intersection angle of greater than 90°. In some cases, the distance between each light source of the one or more light sources may be the same. Alternatively, in some cases, the distance between each light source of the one or more light sources may be different.

Figure 1B:
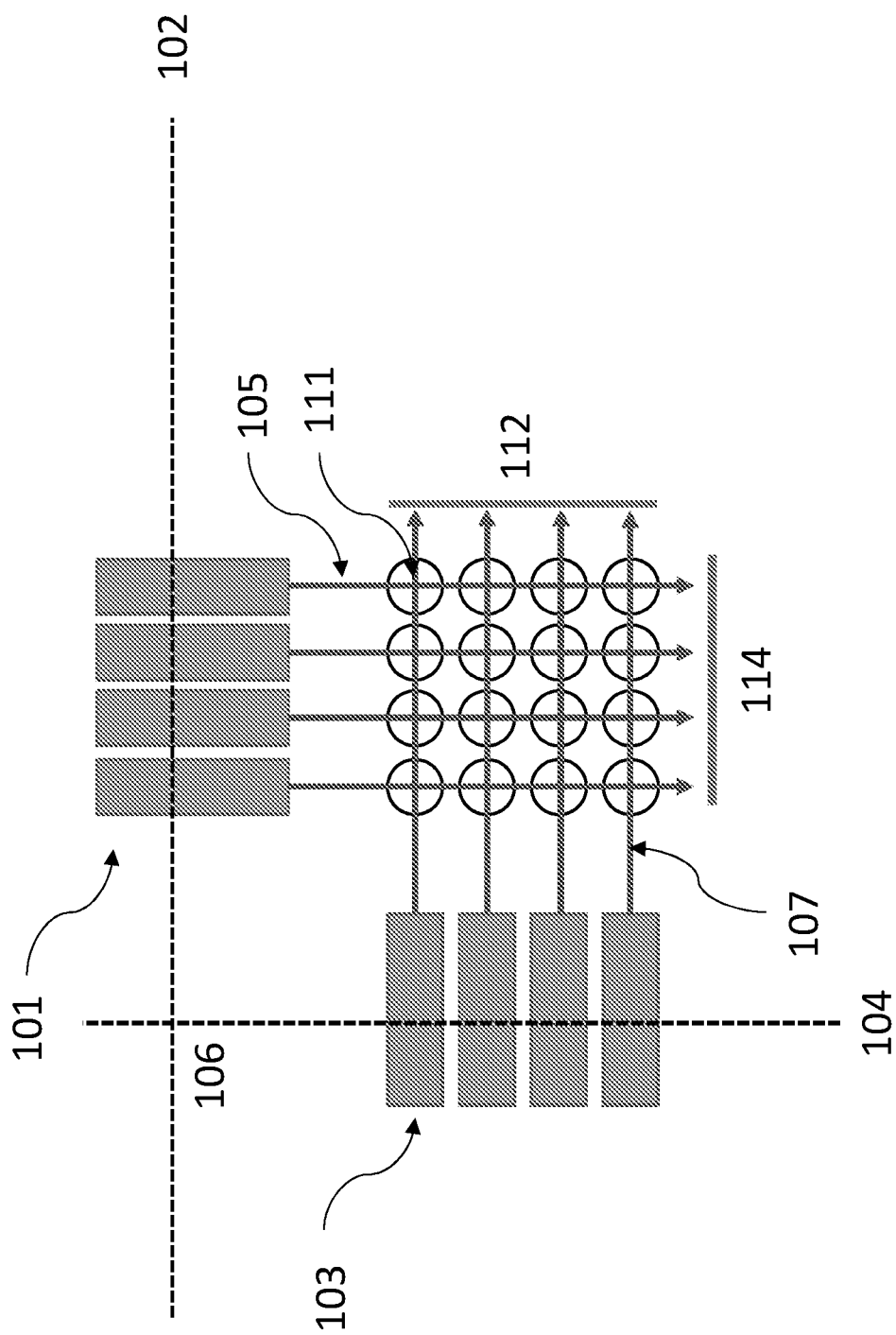
Figure 1C:
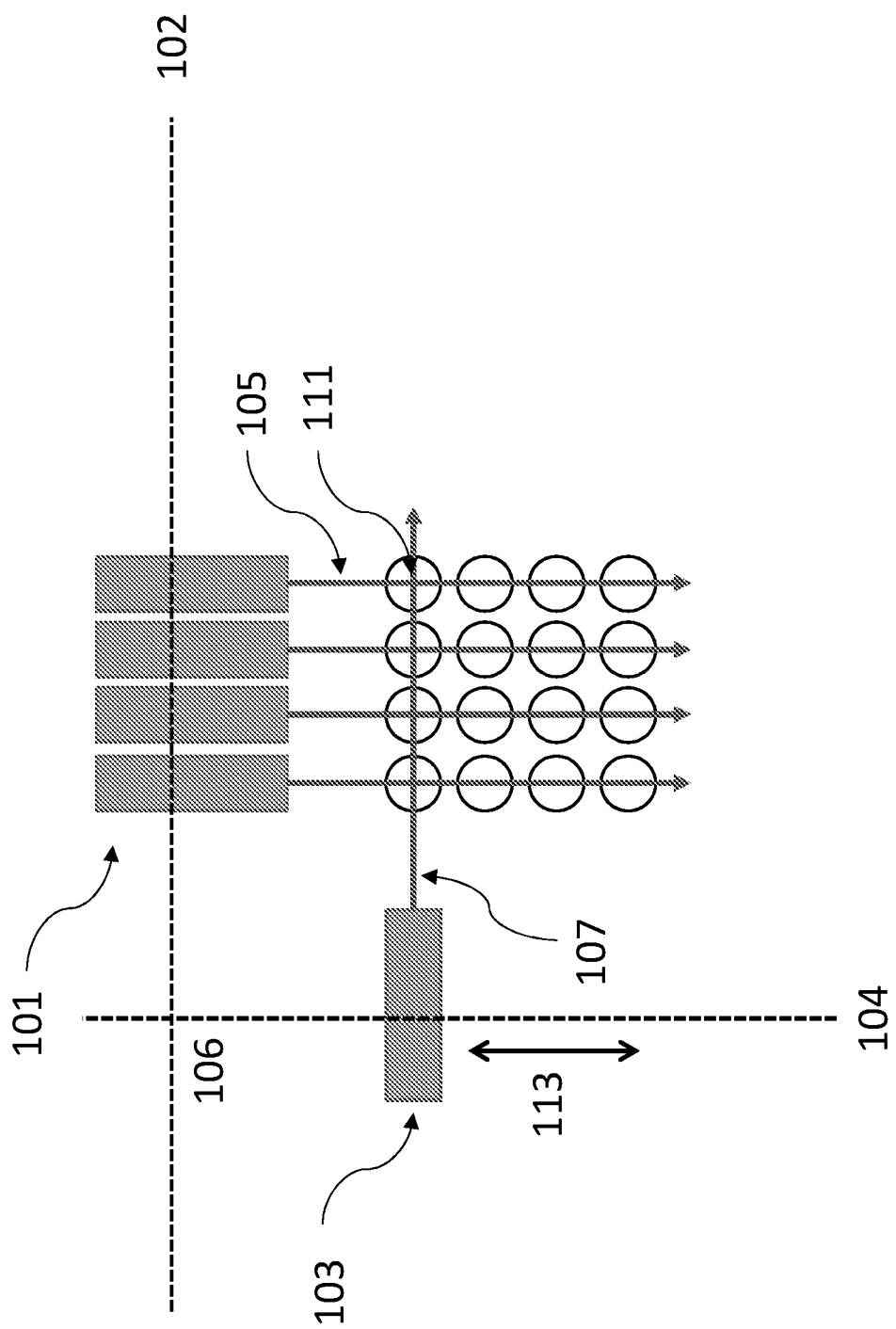

FIG. 1A, FIG. 1B, and FIG. 1C illustrate non-limiting examples of laser-based detection mechanisms, in accordance with the disclosure. As shown in FIG. 1A and FIG. 1B, a plurality of first light sources 101 may be arranged along a first axis 102. Each first light source of the plurality of first light sources may be configured to provide a light beam 105 therefrom. Similarly, a plurality of second light sources 103 may be arrange along a second axis 104. Each second light source of the plurality of second light sources may be configured to provide a light beam 107 therefrom. In some cases, the first axis and the second axis may intersect at an intersection point 106. In some cases, the first axis and the second axis may intersect at a 90° angle. In other cases, the first axis and the second axis may intersect at less than a 90° angle, or at greater than a 90° angle. In some cases, each of the first light sources may be arranged such that the distance between each first light source is the same. In other cases, each of the first light sources may be arranged such that the distance between each first light source is different. Similarly, in some cases, each of the second light sources may be arranged such that the distance between each second light source is the same. In other cases, each of the second light sources may be arranged such that the distance between each second light source is different.

In an alternative arrangement, as depicted in FIG. 1C, a plurality of first light sources 101 may be arranged along a first axis in an array 102. The system may further comprise one or more second light sources 103 on a second axis 104. In some cases, the plurality of first light sources may be stationary (e.g., fixed or not movable). In some cases, the one or more second light sources 103 may be movable along the second axis 113.

The one or more first light sources may be configured such that each of the first light sources may emit a first light beam therefrom 105. Similarly, the one or more second light sources may be configured such that each of the second light sources may emit a second light beam therefrom 107. In some cases, a first light beam may intersect with a second light beam at an intersection angle 111. In some cases, the intersection angle 111 may be about a 90° angle. In other cases, the intersection angle 111 may be less than about a 90° angle, or greater than about a 90° angle.

The one or more first light sources 101, the one or more second light sources 103, or both, may be configured to generate light within any wavelength. In some cases, the one or more first light sources 101, the one or more second light sources 103, or both, may be configured to generate light having a wavelength within the infrared range, for example, from about 700 nm to about 1 mm. In some cases, the one or more first light sources 101, the one or more second light sources 103, or both, may be configured to generate light having a wavelength within the visible light range, for example, from about 380 nm to about 740 nm. In some cases, the one or more first light sources 101, the one or more second light sources 103, or both, may be configured to generate light having a wavelength within the ultraviolet range, for example, from about 10 nm to about 400 nm. The wavelength of the emitted light may be selected based on a desired application. For instance, if the system is in a laboratory condition where the noises arising from ambient light are limited, light in the range of visible light (e.g., from about 380 nm to about 740 nm) may be used. In another instance, if the system is for outdoor use, light in the range outside of the ambient light range, such as in the infrared range (e.g., from about 700 nm to about 1 mm) may be used in order to increase detection sensitivity. When a droplet passes through the light beam emitted from a light source, a change of light level may be detected. Details regarding the dimension of the light beam in accordance with the droplet size will be discussed later herein. In some aspects of the disclosure, a light source may be configured to generate light with a wavelength outside ambient light range, such as from about 700 nm to about 1 mm, which may be advantageous for the system to adapt to various lighting conditions. In some cases, the one or more first light sources 101, the one or more second light sources 103, or both, comprise one or more lasers.

In some aspects, the one or more first light sources 101 may be arranged on a first axis 102, and/or the one or more second light sources 103 may be arranged on a second axis 104. In some cases, the first light sources 101 may be arranged such that light beams 105 emitted from the first light sources are aligned to one another. In some cases, the second light sources 103 may be arranged such that light beams 107 emitted from the second light sources are aligned to one another. In some cases, the first light sources 101 may be arranged such that light beams 105 emitted from the first light sources are parallel, or substantially parallel, to one another. Similarly, in some cases, the second light sources 103 may be arranged such that light beams 107 emitted from the second light sources are parallel, or substantially parallel, to one another. In some cases, the first light sources 101, the second light sources 103, or both, may be aligned in a row. In other cases, the first light sources 101, the second light sources 103, or both, may not be aligned in a row. In some cases, the first light sources 101 and the second light sources 103 may each be arranged in an array and the number of first light sources and the number of second light sources contained in the array may depend on the desired specifications of the system (e.g., the number of droplets to be detected). In some cases (e.g., FIG. 1C), the system may comprise a plurality of first light sources 101, and one or more second light sources 103. In such cases, the plurality of first light sources 101 may be stationary or fixed, and the one or more second light sources 103 may be movable relative to the plurality of first light sources 113. In some cases, the first light sources 101, the second light sources 103, or both, may be evenly spaced (e.g., equidistant between each light source). In other cases, the first light sources 101, the second light sources 103, or both, may not be evenly spaced (e.g., not equidistant between each light source). In particular aspects, the first light sources 101, the second light sources 103, or both, may be arranged such that a distance between each light source is from about 1 mm to about 5 cm. Generally, placement of the light sources may depend on a dimension or arrangement of a plurality of dispensing nozzles.

In some aspects, the number of first light sources may be the same as the number of second light sources. In other cases, the number of first light sources may be different from the number of second light sources. In some cases, a system of the disclosure comprises a plurality of first light sources, and a plurality of second light sources. In other cases, a system of the disclosure comprises a plurality of first light sources, and a single second light source. In other cases, a system of the disclosure comprises a plurality of first light sources, and one or more second light sources. In some cases, a light beam emitted from a first light source may intersect with a light beam emitted from a second light source at an intersection angle 111. In some cases, the intersection angle 111 is from about 20° to about 160°. In particular aspects, the intersection angle 111 may be about 90°, such that the first light beam and the second light beam are substantially orthogonal to each other. Alternatively, the light beam and the second light beam may be oblique to each other. In some aspects, the intersection angle may be determined in accordance with the locations of dispensing nozzles or a substrate to receive the droplets.

In some cases, the light beams may be emitted from retroreflective laser devices. For example, as depicted in FIG. 1A, the light beams may be reflected by a plurality of corresponding reflectors 109 and directed back to a plurality of detectors 108, 110. In such cases, a light source and a detector may be contained in the same housing. In some cases, the light beam may pass through a droplet twice before it is received by the detector, thereby increasing the sensitivity of the detection. The reflectors 109 may be positioned at the opposite side of the light source to pass the light beams back to the detectors 108, 110. In some instances, each retroreflective laser device may comprise a light source and a detector. In some instances, each retroreflective laser device may comprise two or more pairs of a light source and a detector. In some instances, only one reflector is used to pass a plurality of light beams back to the detectors. In other instances, a plurality of reflectors may be used such that each reflector corresponds to a single light beam.

Additionally or alternatively, through laser beam devices may be used, as depicted in FIG. 1B. In such cases, detectors 112, 114 may be positioned at the opposite side of the line-of-sight of the light sources. The light beam received by the detector may pass through a droplet at most once. The path of the light beam from a light source to a detector may or may not be a linear through path. For instance, one or more mirrors, prisms, lenses, or the like may be placed in the light path to change the direction of the light beam. The direction change can be any degree from about 0° to about 180°. The direction change may allow various layouts of the light sources and detectors.

In some cases, the light path of a light beam emitted from a first light source and a light beam emitted from a second light source may be of the same type (e.g., retroreflective). Alternatively, the light path of a light beam emitted from a first light source and a light beam emitted from a second light source may be of different types (e.g., one may be retroreflective, and the other may be through beam).

In some aspects, the system may comprise a plurality of detectors. In some cases, the plurality of detectors may be arranged to detect a level of light received from a plurality of light beams. In some cases, a plurality of first detectors may be arranged to detect light beams emitted from a plurality of first light sources, and a plurality of second detectors may be arranged to detect light beams emitted from a plurality of second light sources. In the case of retroreflective laser devices, a light source and a detector may be contained within the same housing of a laser device.

A detector can be any device that is capable of detecting a level of light. The detector may be configured to generate electrical signals in response to wavelengths of light. An electrical signal produced by the detector may vary according to the level of light. For example, when a light beam passes through a droplet, the presence of a droplet may interrupt a portion of the light beam or the entire light beam thereby causing a change in the level of light received by the detector. The change in the level of light may be reflected by a change of electrical signal. In some cases, a duration of light level change may correspond to a volume of a droplet. In some cases, the system may be configured to differentiate between a droplet and a bubble. In some cases, a pattern or a characteristic of the light level change caused by a droplet may be different to that caused by a bubble. In some cases, the pattern or characteristic of the light level change caused by a droplet may be analyzed to distinguish a bubble from a droplet. In some cases, the detector may be a photoelectric sensor. In some cases, the photoelectric sensor may comprise a photo cell. In some cases, the photoelectric sensor may include additional electronic circuitry, such as, but not limited to, amplifiers, A/D converters, read-out circuits, and the like, for processing or amplifying the signal received from a droplet. In some cases, a light source and a detector may be enclosed within a housing.

A plurality of intersection areas 111 may be formed by a first set of light beams 105 emitted at a first angle and a second set of light beams 107 emitted at a second angle. Each intersection area may or may not intersect a droplet path. In some cases, the intersection areas 111 may be substantially perpendicular to a droplet path. The plurality of intersection areas 111 need not be located on the same plane.

Figure 2:
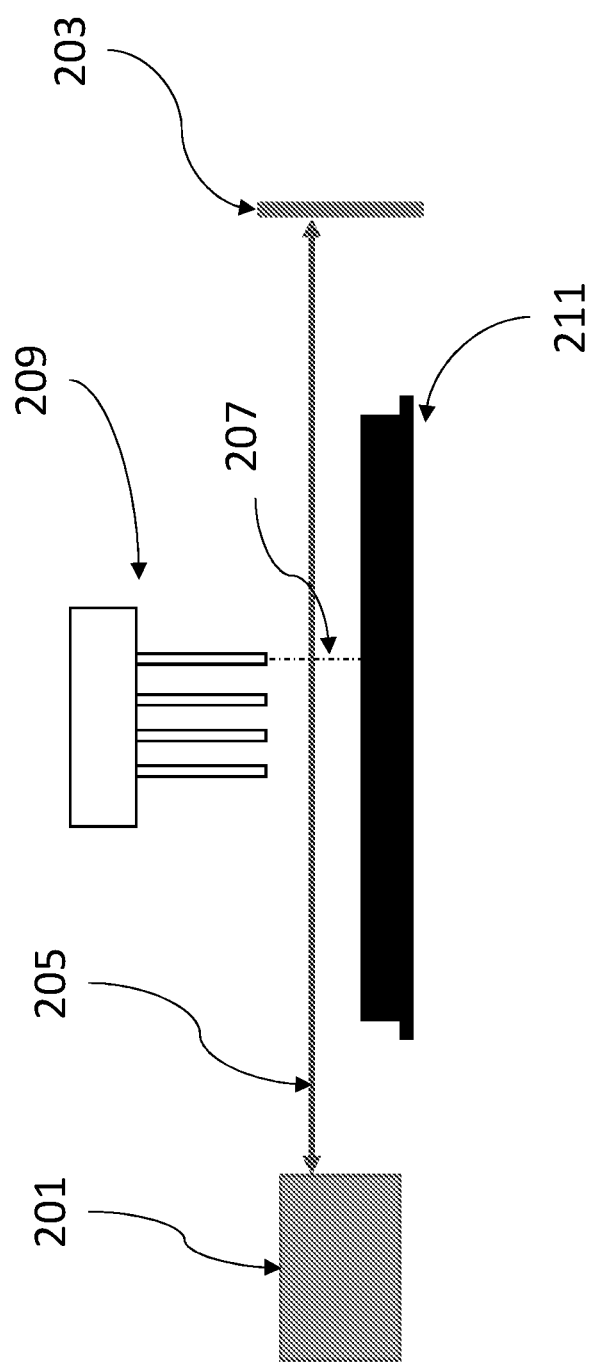
FIG. 2 shows a schematic side view of a non-limiting example of a laser based detection system, in accordance with the present disclosure.

FIG. 2 shows a schematic side view of a non-limiting example of a light beam passing through a droplet path, in accordance with some embodiments of the present disclosure. As shown in FIG. 2, a light beam 205 may intersect a droplet path 207. The light beam may be produced by a light source 201. A light path of the light beam 205 may be changed by a reflector 203. In some cases, the light path may be changed by a reflector 203 by a certain degree to be received by a detector localized at an associated location. In some cases, the light path may be changed by about 180° such that the detector for receiving the light beam may be located substantially in the same place as the light source. In some cases, two or more light beams from at least two different angles may pass through a droplet path at an intersection area. In some cases, one or more droplets may be dispensed from one or more dispensers 209 to reach a substrate 211. In some cases, a droplet path may be substantially vertical.

A substrate 211 may receive one or more droplets dispensed from one or more dispensers 209. The substrate may comprise any suitable structures and materials and may be selected based on the desired application. As described elsewhere herein, the substrate can be any substrate in which droplets may be dispensed thereon. Non-limiting examples of substrates include glass, plastic, membranes, plates, wells, microarrays, and the like. For example, if the substrate is a plate comprising a plurality of wells, the dispensers may be arranged such that each well receives a droplet. In some cases, the substrate comprises a plurality of wells or features. For example, the substrate may comprise at least 1, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, or at least 10,000 wells or features. In some cases, the substrate may be a 96-well plate, a 384-well plate, or a 1536-well plate. In some cases, the density of the positions on the substrate onto which the droplets are to be deposited may determine the layout of the light sources and the dispensers. For instance, a spacing between adjacent laser devices and dispensers may correspond with the spacing of the rows or columns of the substrate. Alternatively, the layout of the laser devices and dispensers need not be the same as the layout of the substrate. In some instances, the substrate may be disposed on a fixed stage. In some instances, the substrate may be configured to move relative to the dispensers by a movable stage in a planar plane. For example, a movable stage actuated by a suitable actuation mechanism (e.g., piezo-actuated) may be used to position the substrate in different locations such that a resolution of the locations where the droplets are deposited is increased or a total area where the droplets are deposited is expanded.

One or more dispensers 209 may be configured to dispense one or more droplets to move along one or more droplet paths 207. A dispenser may use any suitable mechanism to allow a volume of liquid to be forced through a nozzle of the dispenser, thereby forming a droplet. For example, a dispenser may be based on the use of solenoid valve dispensers. These dispensers may comprise a small solenoid-activated valve which can be opened and closed electronically at high speeds. A solenoid valve may be connected to a pressurized vessel or reservoir containing a fluid (e.g., a reagent) to be dispensed. In operation, a solenoid valve may be energized by a pulse of electrical current, which may open the valve for a predetermined duty-cycle or open time. A small volume of liquid may be forced through the nozzle thereby forming a droplet which may then be ejected from the valve onto the target substrate. The size and frequency of the droplets may be controlled by adjusting the frequency and pulse-width of energizing current provided to the solenoid valve and/or by adjusting the pressure of the reservoir. In some cases, a controller may be used to control a dispenser individually or a plurality of dispensers collectively. In some cases, the operation of each individual dispenser may be controlled in accordance with the operation of laser detection devices, as described herein.

In some aspects, the one or more dispensers 209 may be stationary relative to the substrate. In some cases, the one or more dispensers 209 may not have a horizontal movement relative to the substrate. In such cases, one or more locations for receiving droplets on the substrate may correspond to the arrangement or layout of the one or more dispensers. In other aspects, the one or more dispensers 209 may be movable. In some cases, the one or more dispensers 209 may be configured to move horizontally relative to the substrate. In such cases, the locations for receiving droplets may be controlled by controlling the movement of the dispensers relative to the substrate. Suitable actuators such as motors may be controlled to move the one or more dispensers translationally relative to the substrate. In some aspects, the one or more dispensers 209 may be fixed while the substrate may be configured to move relative to the dispensers. For example, the substrate may be mounted on a movable stage which may be actuated to move relative to the dispensers. Control of the movement of the dispensers and/or substrate can be implemented by the same software for controlling a dispensing step as described later herein.

A light beam may have a variety of shapes, such as a beam sheet or a beam spot. For example, the shape of the light beam can be square, rectangular, circular, and the like. In a non-limiting example, the light beam may have a rectangular shape with a dimension of about 0.01 mm×about 1.5 mm. In another non-limiting example, the light beam may be a circular spot with a diameter in a range from about 0.01 mm to about 5 mm. The dimensions of the light beam may vary. In some cases, at least a dimeter or a width of the light beam can be varied. A dimension of the beam sheet or beam spot may determine an intersection or detection area that the droplet passes through. For example, an intersection area formed by two beam sheets with a width of 1 mm is 1 mm². The width of the beam sheet may or may not be greater than a diameter or a width of the droplet. For example, when the width of the beam sheet is smaller or equal to the diameter of the droplet, a light level detected by a detector may be reduced significantly (e.g., close to zero) when a droplet passes through. In another example, when the width of the beam sheet is wider than the diameter of the droplet, a light level detected by the detector may be reduced but may be greater than zero. The width of the beam sheet should be determined such that a change of light level caused by the presence of a droplet can be detected accurately and precisely. Similarly, when the light beam is a beam spot, the diameter of the beam spot should be determined such that a light level reduced by the presence of a droplet can be detected. In some cases, a width or a height of the light beam may also affect the portion of light obstructed/deflected by the droplet. For example, a beam spot or a beam sheet may have a width or a height greater than a vertical dimension of the droplet.

Figure 3:
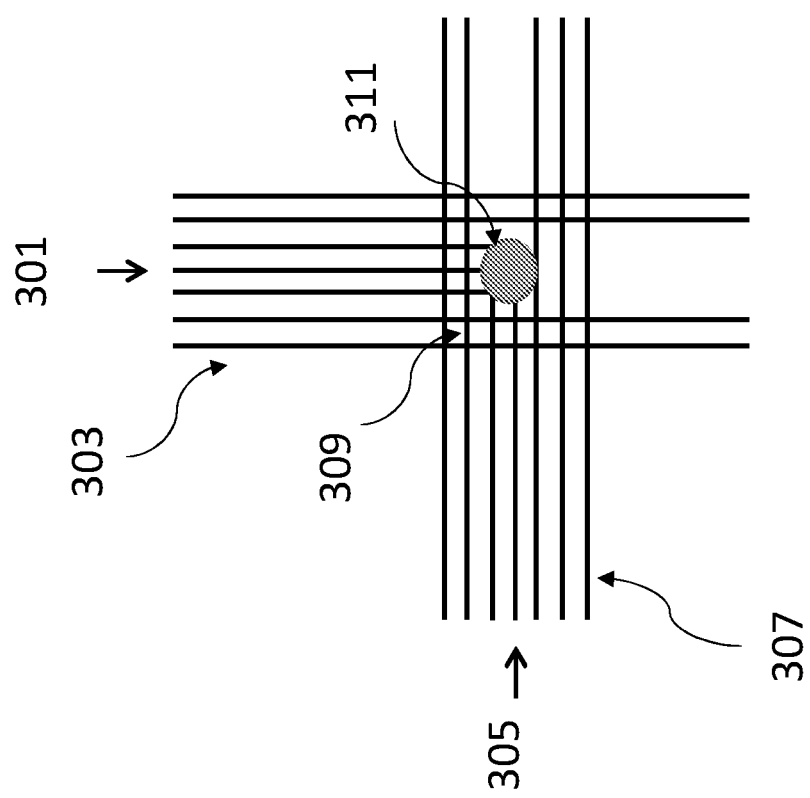
FIG. 3 shows a non-limiting example of a droplet passing through an intersection area, in accordance with the present disclosure.

FIG. 3 shows a non-limiting example of a droplet 311 passing through an intersection area 309. The intersection area 309 may be formed by a first light beam 303 provided from a first angle 301 and a second light beam 307 provided from a second angle 305. As depicted in FIG. 3, the first angle may be, but need not be, normal to the second angle. In some cases, the two angles can be oblique to each other as described elsewhere. In some cases, as a droplet passes through an intersection area 309, a portion of the light beam may be obstructed thus leading to a reduction of light received by a detector. The obstructed portion may be in a range from 10% to 100%. The obstructed portion may be affected by a ratio of a diameter or width of the droplet 311 relative to the width of the light beam 303, 307. In some cases, the obstructed portion may also be affected by the width or height of the light beam and an intersection volume. A change of light level may indicate the presence of a droplet. In some cases, a volume of the droplet may be calculated based on a duration of light level change. In some cases, a bubble may be detected. In some cases, a bubble may be distinguished from a droplet based on a pattern of the light level change.

Further to FIG. 3, one or more detectors may be configured to detect a light level change with respect to the two light beams. As mentioned previously, the detectors may output electrical signals in response to the light. The electrical signal may be further processed such as amplified by a DC amplifier and converted from current to voltage signal by a converter. In some cases, one or more processors may be configured to analyze output signals from a plurality of detectors provided in two directions.

Figure 4:
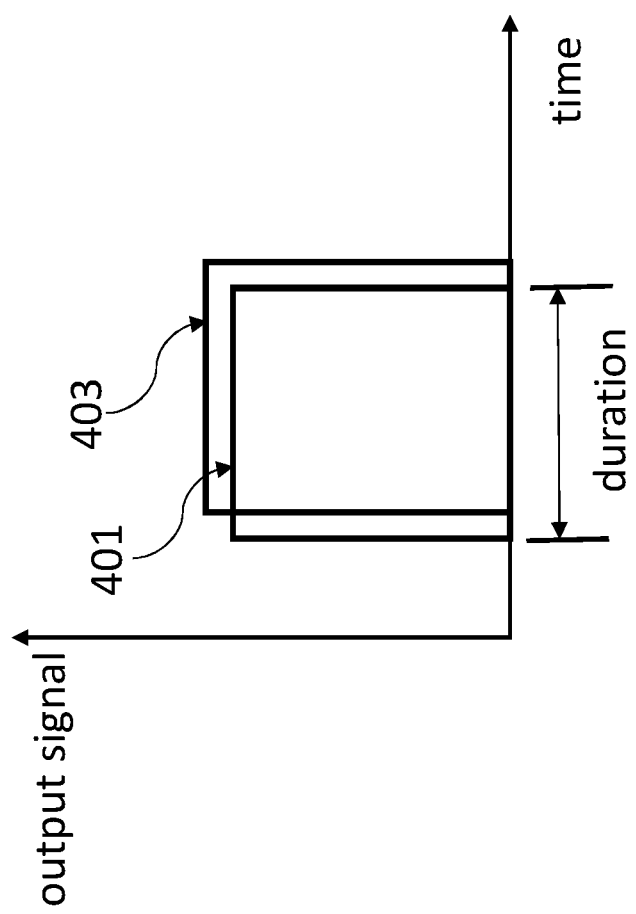
FIG. 4 shows a non-limiting example of output signals from two detectors corresponding to a droplet passing through an intersection area, in accordance with the present disclosure.

FIG. 4 shows an example of output signals from two detectors corresponding to a droplet passing through an intersection area. Output signals from at least two detectors provided in two different angles (e.g., a first angle 301 and a second angle 307 in FIG. 3) may be processed and displayed as shown in FIG. 4. In this example, a droplet may pass through an intersection area corresponding to light beams from two directions. Each light beam may be received by a detector and the output signal is displayed accordingly. Any suitable operations may be applied to the output signal for display. For example, the output signal may be normalized, scaled, inverted, filtered, etc. In some cases, the operations may not change the timing or a pattern of the output signal. The output signals may reflect a change of light level. For instance, the amplitude change of the output signal 401 indicates that a droplet is passing through the corresponding intersection area, and the time taken for the droplet to pass through the intersection area is shown as the duration.

In some cases, two output signals 401 and 403 corresponding to the detection of the same droplet may or may not have the same amplitude. For example, a droplet may not be symmetric from the two angles as the two light beams cross through the droplet, thus the light deflected by the droplet in the two directions may not be the same. In some cases, when a change of output signal from different detectors occurs simultaneously, it may indicate that the output signals are from the same droplet. In some instances, the detectors that detect the same light level change simultaneously may be checked against the corresponding dispenser to confirm whether the dispensing is an error. In some cases, when a droplet is dispensed from a nozzle and the corresponding two detectors are known, if the output signals from the corresponding detectors both show the presence of a droplet simultaneously with a substantially similar pattern, then the droplet is confirmed to be dispensed correctly.

The duration of a light level change may depend on a travelling speed of the droplet and a volume of the droplet. In some cases, when the travelling speed is fixed such as by controlling one or more parameters of the dispensers, the duration may be proportional to the volume of the droplet. In some cases, the duration that can be detected is at least 1 millisecond.

A variety of means may be used to calculate a volume of the droplet based on the detected output signal (e.g., duration). For instance, if the travelling speed, size of the nozzle, and the like, are known, a volume of the droplet can be determined. Calibration may be performed to establish a correlation between a volume of droplet and the duration at a certain travelling speed. For example, a gravimetric device may be used to measure the real volume of a droplet corresponding to a detected duration under certain parameters for controlling the dispensing system. In some cases, different liquids may have different correlations.

Figure 5:
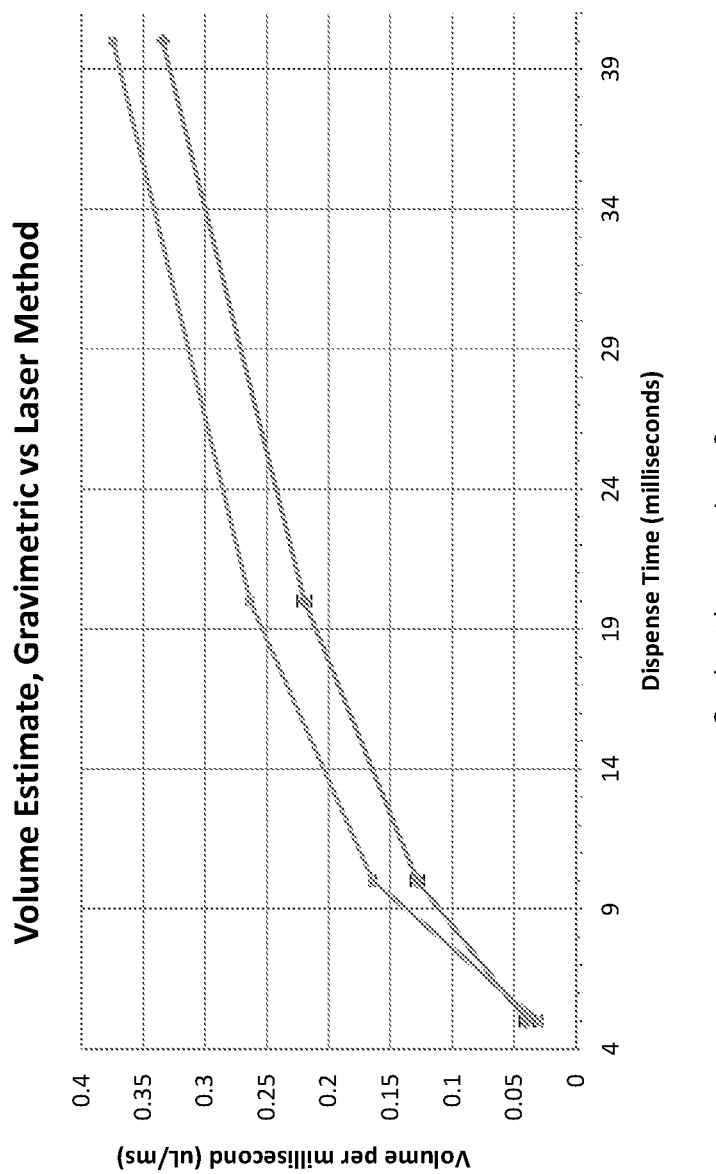
FIG. 5 shows a diagram of a non-limiting example of a volume detection validation result, in accordance with the present disclosure.

FIG. 5 shows a non-limiting example diagram of a volume detection validation result, in accordance with the disclosure. In this example, the liquid reagent tested is alcohol. The volumes of the droplets are measured by gravimetric device for validating the data produced by the system. The offset between the two curves is due to fact that the dispense time (i.e., duration) for the gravimetric method is the command dispense time rather than the detected duration. The volume and duration/dispense time curve may be dependent on several factors such as characteristics of the dispensing system (e.g., fluid path impedance, fluid path length, nozzle size, pressure, etc.), and/or characteristics of the liquid (e.g., density, viscosity, etc). In some cases, the curve of the volume and dispense time may be pre-determined for different reagents and dispensing system and stored in a database that is assessable to one or more processors.

Figure 6A:
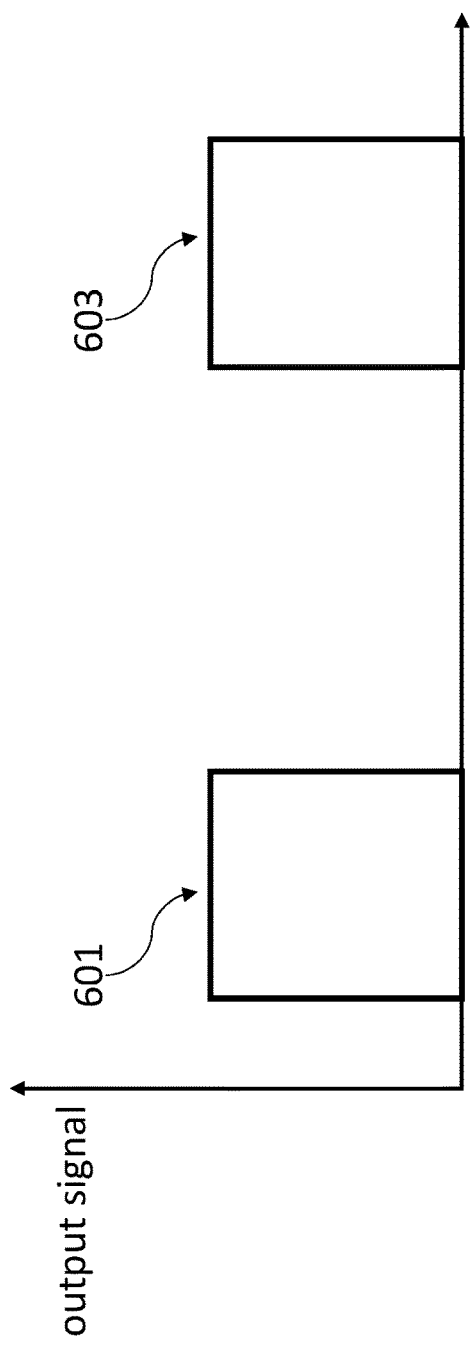
FIG. 6A and FIG. 6B illustrate non-limiting examples of output signals from one or more detectors, in accordance with the present disclosure.
Figure 6B:
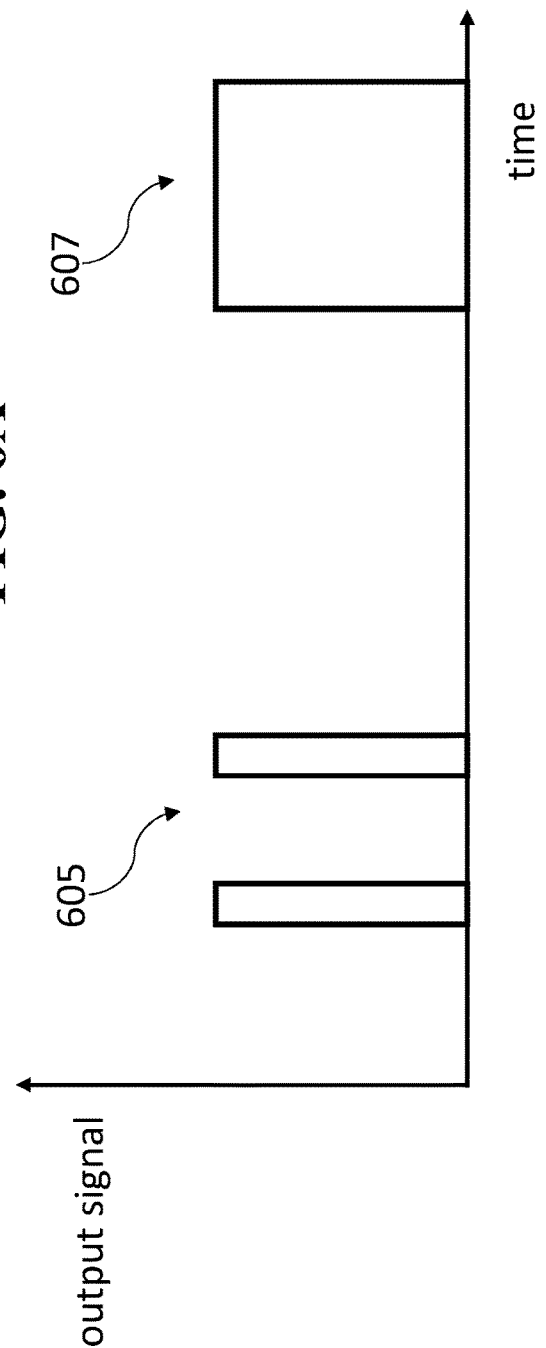

In other aspects, a system is provided that is capable of distinguishing between a droplet and a bubble. In some cases, a pattern of the detected level of light may be analyzed to identify the presence of a bubble or a droplet. FIG. 6A and FIG. 6B illustrates non-limiting examples of output signals from one or more detectors. In some cases, the output signal corresponding to two sequential droplets may appear as the signals 601 and 603 as depicted in FIG. 6A. In some cases, the output signal corresponding to a bubble may appear as signal 605 as depicted in FIG. 6B. In some cases, the output signal corresponding to a bubble may have different characteristics from the output signal corresponding to a droplet. For example, an output signal corresponding to a bubble may be discrete short signals 605, and the output signal corresponding to a droplet may be a continuous long signal 601. In some cases, the duration of the short signal (e.g., representing the presence of a bubble) may be in the range from about 1 millisecond to about 10 milliseconds. In some cases, the latency between the two short signals 605 may be near the duration of a droplet signal (e.g., signal 607). This discrepancy may be used to distinguish a bubble from a droplet. Information regarding the existence of bubbles may have important applications. For example, detection of a bubble may indicate a lack of dispensing volume. In such cases, the corresponding position on the substrate may or may not receive another droplet to compensate for the missing volume due to the bubble. In another example, the frequency of bubble presence may be used as an indication of a quality or a characteristic of the liquid.

In some cases, one or more dispensers may be configured to dispense droplets sequentially or concurrently. FIG. 7A and FIG. 7B illustrate examples of droplets dispensed concurrently or sequentially, in accordance with aspects of the disclosure. As shown in FIG. 7A, a plurality of dispensers 705 (perpendicular to the paper) may be arranged in a two-dimensional array with each dispenser corresponding to two light beams from a first angle and a second angle, respectively. The two-dimensional array may comprise multiple columns and multiple rows. The number of columns and rows may or may not be equal. In some cases, at each time point, only one dispenser is controlled to deposit a droplet 707. A change of light level may be detected by corresponding detectors 701 and 703 in response to the presence of the droplet 707. In other cases, multiple droplets may be deposited to a substrate concurrently. As shown in FIG. 7B, a row of dispensers may be controlled to fire a row of droplets and a light level change may be detected by a detector 709 from a first angle and a plurality of detectors 711 from a second angle. Alternatively, a plurality of dispensers may be arranged in a one-dimensional array 711. The plurality of dispensers may be configured to move to different positions relative to the substrate for depositing droplets by either moving the dispensers or moving the substrate. In some cases, the frequency for firing droplets may be lower than 0.5 Hz.

In some cases, the dispensers may be arranged in a single array. The array may include at least 1, 2, 3, 4, 5, 6, 7, 8, 9, 10, 15, 20, 25, or more dispensers. The dispensers may be arranged in a two-dimensional array. The number of columns and rows may or may not be equal. In some cases, the number of rows may match the number of columns, such as 2×2, 3×3, 4×4, 5×5, 6×6, 7×7, 8×8, 9×9, 10×10, etc. In some cases, the number of columns is not equal to the number of rows, such as 1×8, 2×5, 2×10, 3×6, etc.

In some aspects, a resolution or a size of the locations where the droplet is deposited on a substrate can be adjusted. A resolution may refer to a spacing between neighboring locations on the substrate where the droplet is deposited. A size may refer to the total number of locations for receiving the droplets. A size of locations may refer to the region on the substrate that is capable of receiving droplets. The resolution of spacing may depend on the arrangement of the dispensers. For example, the resolution of spacing may be associated with a spacing between the dispensers in an array. The resolution of spacing may also depend on a relative location between the one or more dispensers and the substrate. For instance, the dispensers or substrate may be configured to move relative to each other such that the locations where the droplets are deposited can be controlled. In some cases, the dispensers may be controlled to move relative to the substrate and the substrate may be stationary. In some cases, the substrate may be mounted on a stage which may be controlled to move (e.g., an actuated stage) relative to the dispensers. In other cases, both of the dispensers and the substrate may be controlled to move relative to each other.

In some cases, the position of the dispensers may be fixed relative to the position of the one or more detectors. In this case, the number of dispensers may be associated with the number of detectors. In some cases, a pair of detectors may be uniquely associated with a dispenser. For instance, a dispenser may be associated with two dispensers from the row and column direction, respectively. In some cases, the dispensers may be movable relative to the detectors. In some cases, the number of dispensers may not be associated with the number of detectors. In the non-limiting example depicted in FIG. 7B, an array of dispensers 713 may be configured to move relative to the detectors, and a dispenser may be associated with different detectors as it moves to a different location.

In some aspects, the present disclosure provides systems for controlling volumes of droplets deposited to a substrate. A system may comprise a dispensing unit for dispensing one or more droplets. A system may further comprise a detection unit that is configured to detect and measure one or more characteristics of the droplets. A system may further comprise one or more processors configured to control the dispensing unit and the detection unit to control the volume of droplet depositing to a substrate. In some cases, the system is configured for identification of the presence of a bubble, measurement of volume in real-time, and automatically adjusting dispensing according to the measurement.

Figure 8:
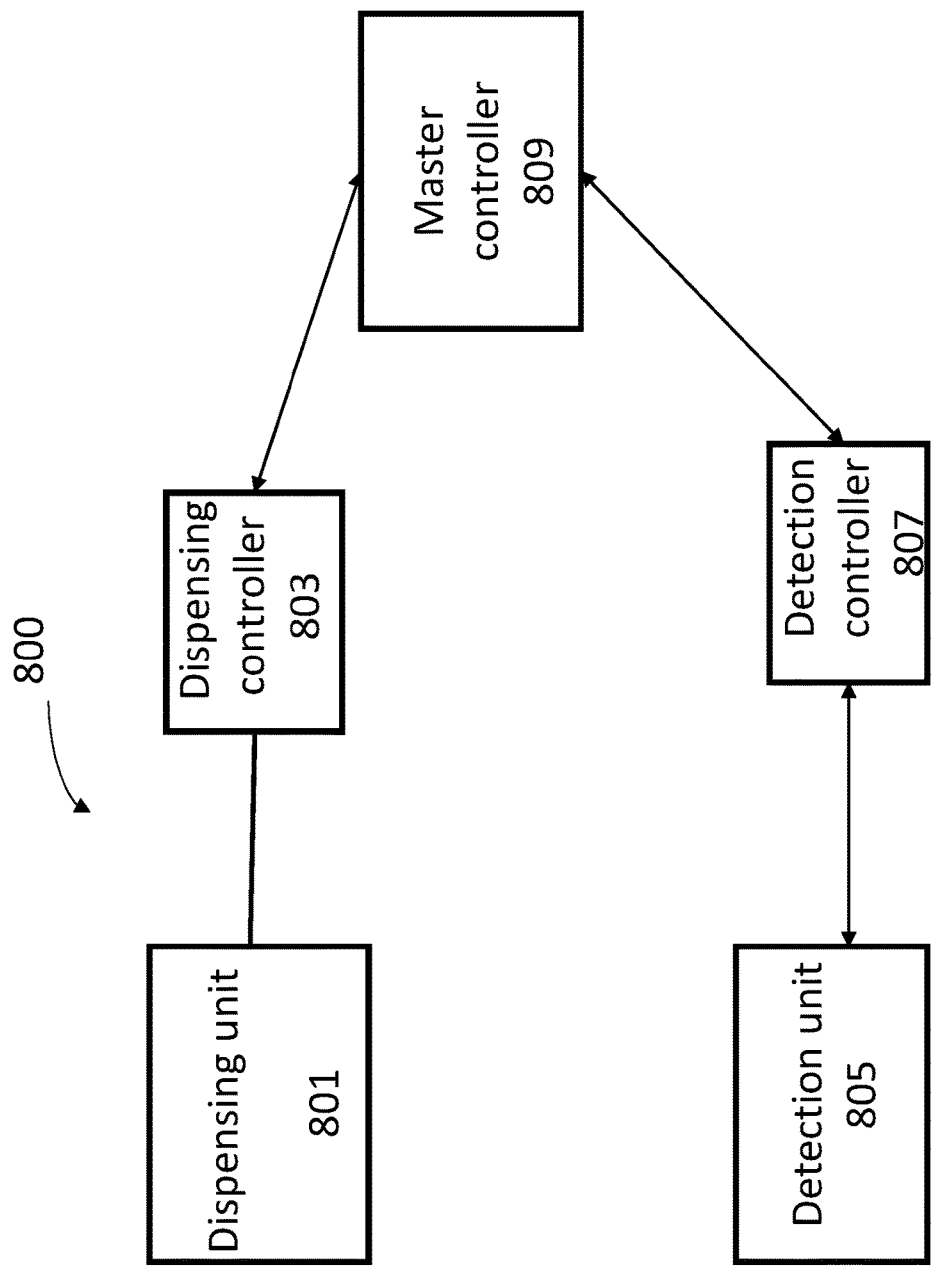
FIG. 8 illustrates a block diagram of a non-limiting example of a system, in accordance with the present disclosure.

FIG. 8 illustrates a bock diagram of a non-limiting example of a system 800, in accordance with aspects of the disclosure. A dispensing unit 801 may comprise a plurality of dispensers as described previously. A dispensing unit 801 may be controlled by a dispensing controller 803. The dispensing controller 803 may be configured to control each dispenser/nozzle of a dispensing unit individually or collectively. A detection unit 805 may comprise a plurality of light sources and detectors. In some cases, the light sources and detectors may be laser-based devices and the detectors may be configured to detect a light level of a light beam emitted from the light sources. A detection unit 805 may communicate with a detection controller 807. A detector controller may be configured to alter the "on-off" function of the laser devices. A detection unit 805 may provide a detected signal to the detector controller. A master controller 809 may be included to communicate with the dispensing controller 803 and a detection controller 807 for analyzing a feedback signal from the detector and generating a dispensing command to input to the dispensing controller 803.

In some cases, a dispensing unit 801 may comprise a plurality of solenoid valve dispensers. These dispensers may comprise a small solenoid-activated valve which may be opened and closed electronically at high speeds. A solenoid valve may be connected to a pressurized vessel or reservoir containing the fluid (e.g., a reagent) to be dispensed. In operation, a solenoid may be energized by a pulse of electrical current, which may open the valve for a predetermined duty-cycle or open time. A volume of liquid may be forced through the nozzle thereby forming a droplet which may then be ejected from the valve to the target substrate. In some cases, the size and the frequency of the droplets can be controlled by adjusting the frequency and pulse-width of energizing current provided to the solenoid valve and/or by adjusting the pressure of the reservoir.

A dispensing controller 803 may be used to control the plurality of dispensers contained in the dispensing unit 801 individually, or a plurality of dispensers collectively. A dispensing controller 803 may be an industry standard input/output I-O controller (not shown), such as an RS232 interface to send command signals to control the opening or closing of the valves associated with the dispensers. A dispensing controller 803 may be configured to communicate with a master controller 809. For example, a master controller may send commands to the dispensing controller 803 to operate the dispensing unit according to a feedback signal provided by the detection controller 807. The commands may include, but are not limited to, activation duration of a valve, frequency of dispensing, the number of valves to be activated, the activation commands associated with each individual dispenser, and the like. In some cases, commands may include a dispensing schedule that determines a sequential order for the nozzles or dispensers to operate. For instance, the schedule may instruct the dispensers to operate sequentially in a row and column order. The schedule may be based on a layout of the plurality of dispensers. In some cases, an operation schedule for the detection unit 805 may be generated according to the dispensing schedule.

A detection unit 805 may comprise a plurality of light sources and detectors as described elsewhere herein. In some cases, the light sources and/or detectors are arranged in an array, such as those described herein. Each pair of laser devices may include a light source and a detector. In some cases, at least two pairs of laser devices may be used to detect droplet volumes arranged from two directions. The light source and detector may be on all the time during the entire course of dispensing. Alternatively, the light source and detector may be controlled to operate in accordance with the dispensing unit. For example, a specific dispenser may be instructed by the controller to dispense a droplet, the detection unit may receive a command to turn on the laser device (either the light source, the detector, or both) corresponding to the specific dispenser. A detection controller 807 may comprise any suitable circuit board to receive and process signals produced by the detectors as described previously. The signals may be, for example, amplified, modulated, normalized, filtered, digitized, etc. The detection controller 807 may output the signals to the master controller 809 for further analysis. In some cases, the detection controller may receive a command from the master controller to instruct one or more laser devices to be on or off. Communications between the detection controller and the master controller can be wired, wireless, or a combination thereof. Similarly, communications between the dispensing controller and the master controller can be wired or wireless.

A master controller 809 may comprise one or more processors configured to analyze feedback signals provided by the detectors and may generate commands to operate one or more dispensers and laser devices according to the feedback signal. For example, the volume of a droplet may be calculated by the master controller based on a pre-calculated or pre-determined volume-dispense time curve stored in a memory storage coupled to the master controller. In another example, a bubble may be identified corresponding to a dispenser, and the master controller may instruct the dispensing unit to deposit a droplet into that location to compensate for the missing volume. In a further example, when less than or more than the number of droplets are detected as compared to an original dispensing command, the master controller may generate a dispensing command to operate the corresponding dispensers to even out the dispensing in each location of the substrate. Alternatively, the master controller may not generate any compensation command; instead, the master controller may inform a user of such error through a user interface.

In some cases, the master controller 809 may implement programs to allow user input parameters to set or change control parameters of the system. For instance, a user may be allowed to set a desired volume of the droplet, type of liquid, substrate specifications, select dispensing frequency, compensation plans (e.g., report only or auto-correct volume of droplet), preferred output display, etc. The master controller may be configured to inform a user when an error of droplet volume is detected such as a missing droplet or a bubble. The master controller may implement software or programs to analyze the presence of bubbles and may generate a result in terms of a quality of the liquid based on the quantification of bubbles. The software or programmed run on the master controller may automatically generate control parameters to operate the dispensing unit according to one or more input parameters provided by the user such as a liquid type, target substrate dimension, etc.

A master controller 809 may be a computer system(s) that may include a memory location, a communications interface, a display interface and, in some cases, a data storage unit, which may all be operatively coupled to a processor, such as a central processing unit (CPU). The memory location may include one or more of flash memory, cache and a hard disk. In some situations the memory location may be read-only memory (ROM) or random-access memory (RAM), to name a few examples.

In some aspects, the system may be configured to deposit a series of individual droplets to a desired position of a substrate (e.g., into a single well or feature of a substrate). In such cases, each position on the substrate (e.g., a well or feature) may contain a plurality of droplets. For example, the system may be configured to deposit at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, or at least 1000 individual droplets to a desired position on a substrate (e.g., into a single well or feature of a substrate) Additionally or alternatively, in some cases, the system may be configured to deposit a single droplet to a plurality of positions on a substrate (e.g., to a plurality of wells or features on a substrate). In such cases, each position on the substrate (e.g., well or feature) may contain a single droplet. For example, the system may be configured to deposit a single droplet to at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, at least 1000, at least 1100, at least 1200, at least 1300, at least 1400, at least 1500, at least 1600, at least 1700, at least 1800, at least 1900, at least 2000, at least 5000, or at least 10,000 positions on a substrate (e.g., a well or feature of a substrate). In one non-limiting example, the substrate may be a 96-well plate, a 384-well plate, or a 1536-well plate, and the system may be configured to deposit a single droplet into each well of the plate. In another non-limiting example, the substrate may be a 96-well plate, a 384-well plate, or a 1536-well plate, and the system may be configured to deposit a plurality of droplets into each well of the plate.

In some aspects, the system may be configured to deposit a plurality of droplets in a duration of time. In some cases, the system may be configured to deposit a plurality of droplets onto a substrate in about 5 µs, about 10 µs, about 15 µs, about 20 µs, about 25 µs, about 30 µs, about 35 µs, about 40 µs, about 50 µs, about 55 µs, about 60 µs, about 65 µs, about 70 µs, about 80 µs, about 85 µs, about 90 µs, about 100 µs, about 200 µs, about 300 µs, about 400 µs, about 500 µs, about 600 µs, about 700 µs, about 800 µs, about 900 µs, about 1 ms, about 10 ms, about 20 ms, about 30 ms, about 40 ms, about 50 ms, about 60 ms, about 70 ms, about 80 ms, about 90 ms, about 100 ms, about 200 ms, about 300 ms, about 400 ms, about 500 ms, about 600 ms, about 700 ms, about 800 ms, about 900 ms, or about 1 s. In particular aspects, the system may be configured to deposit a plurality of droplets onto a substrate in about 5 µs to about 1 s.

In some aspects, a system of the disclosure may be configured to deposit a plurality of droplets onto a substrate accurately. For example, the system may be configured to deposit a plurality of droplets onto a substrate with an error rate of less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1%. In some aspects, a system of the disclosure may be configured to deposit from about 1 to about 1000 droplets onto a substrate in about 5 µs to about 1 s with an error rate of about 1-20%.

Figure 9:
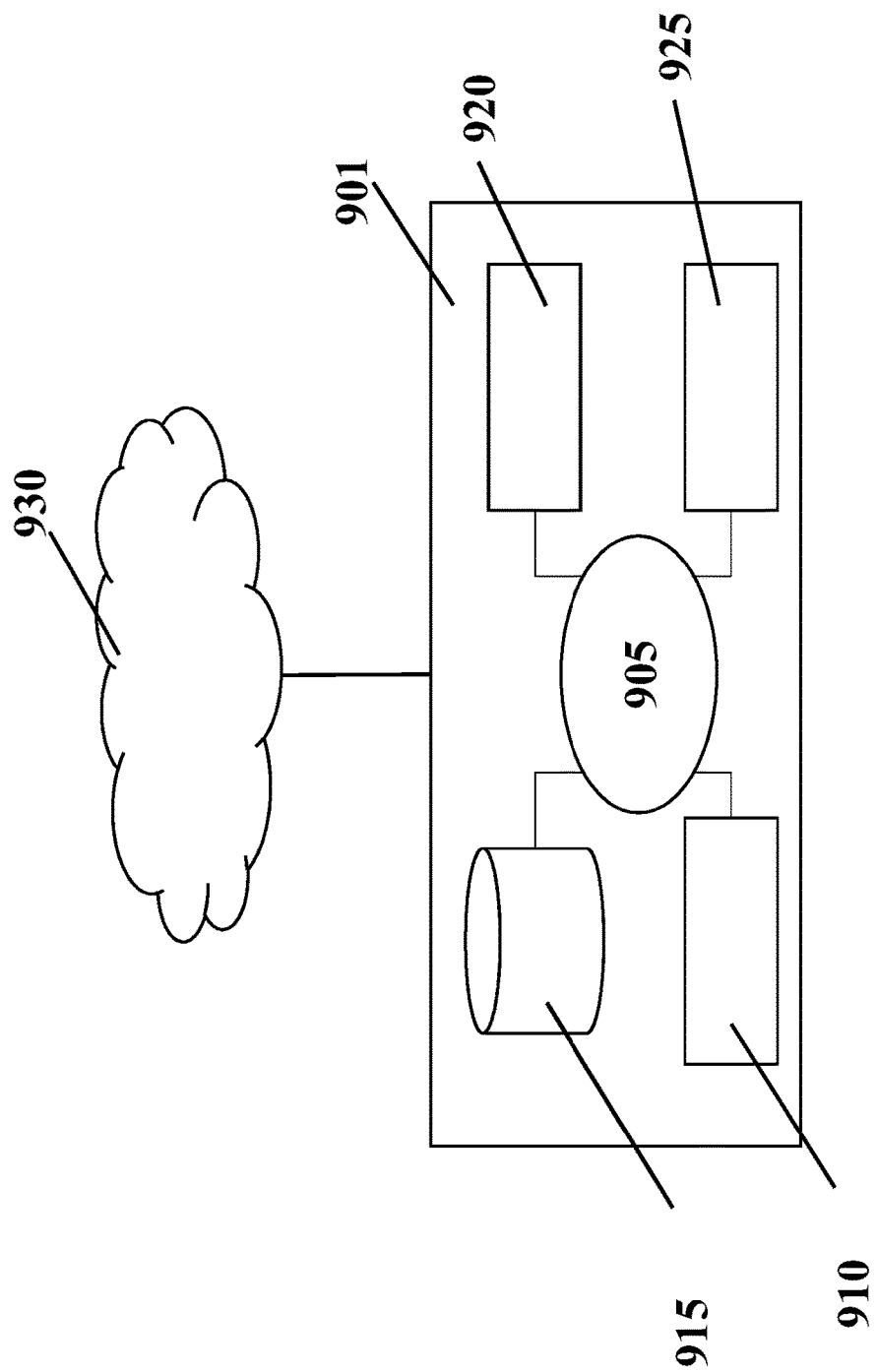
FIG. 9 shows a non-limiting example of a computer system that is programmed or otherwise configured to receive feedback data from detectors or detection controllers, in accordance with the present disclosure.

The present disclosure provides computer control systems that are programmed to implement methods of the disclosure. FIG. 9 shows an example computer system 901 that is programmed or otherwise configured to receive feedback data from detectors or detection controllers. The computer system can be further programmed to analyze the data to identify bubbles and droplets based on light level change, calculating volumes of droplets based on a change of light level, generate a dispensing command in response to the feedback data, or any combination thereof. The computer system can send commands to operate a plurality of laser devices and dispensers.

A computer system 901 may include a central processing unit (CPU, also "processor" and "computer processor" herein) 905, which can be a single core or multi core processor, or a plurality of processors for parallel processing. The computer system 901 also may include memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 may be in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

A CPU 905 can execute a sequence of machine-readable instructions, which can be embodied in a program or software. The instructions may be stored in a memory location, such as the memory 910. Examples of operations performed by the CPU 905 can include fetch, decode, execute, and writeback.

A CPU 905 can be part of a circuit, such as an integrated circuit. One or more other components of the system 901 can be included in the circuit. In some cases, the circuit is an application specific integrated circuit (ASIC).

A storage unit 915 can store files, such as drivers, libraries, and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

A computer system 901 can communicate with one or more remote computer systems through the network 930. For instance, the computer system 901 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

A computer system 901 can include or be in communication with an electronic display that comprises a user interface (UI) for providing, for example, the user interface can display one or more graphical representation of one or more sensor measurements in real time or over a given historical period to a user. Examples of UI's include, without limitation, a graphical user interface (GUI) and web-based user interface.

A display page may comprise well known features of graphical user interface technology, such as, for example, frames, windows, tabs, scroll bars, buttons, icons, menus, fields, and hyperlinks, and well known features such as a "point and click" interface. Pointing to and clicking on a graphical user interface button, icon, menu option, or hyperlink also is known as "selecting" the button, icon, option, or hyperlink. Additionally, a "point and gesture" interface may be utilized, such as a hand-gesture driven interface. Furthermore, a touchscreen interface may be utilized, where touching a visual object may constitute selecting the object. Any other interface for interacting with a graphical user interface may be utilized. A display page according to the disclosure also may incorporate multimedia features. User interfaces and/or communications/controls provided herein may be implemented using one or more computer systems (e.g., client computer).

A computer system(s) may be embodied in programming. Various aspects of the technology may be thought of as "products" or "articles of manufacture" typically in the form of machine (or processor) executable code and/or associated data that is carried on or embodied in a type of machine readable medium. Machine-executable (also "computer-executable" herein) code may be stored on an electronic storage unit, such as one or more memory (e.g., ROM, RAM) or one or more hard disks. Examples of hard disks may include magnetic and solid state recording media. "Storage" type media may include any or all of the tangible memory of computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air links. The physical elements that carry such waves, such as wired or wireless links, optical links or the like, also may be considered as media bearing the software. As used herein, unless restricted to non-transitory, tangible "storage" media, terms such as computer or machine "readable medium" may refer to any medium that participates in providing instructions to a processor for execution.

The disclosure herein further provides methods for droplet dispensing. In some aspects, the methods may involve use of any of the systems provided herein. In some cases, a method of the disclosure may comprise (a) actuating a dispenser, wherein the dispenser is configured to dispense a droplet onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, a characteristic of a droplet.

In some aspects, a method of the disclosure may comprise (a) actuating a dispenser, wherein the dispenser is configured to dispense a droplet onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, whether a droplet or a bubble is deposited onto the substrate at a given position. In some cases, the method further comprises when a bubble is deposited onto the substrate at the given position, actuating a dispenser to deposit a droplet onto the substrate at the given position.

In some aspects, a method of the disclosure comprises: (a) actuating a dispenser, wherein the dispenser is configured to dispense one or more droplets onto a substrate; (b) emitting a first light beam from a first light source; (c) emitting a second light beam from a second light source, wherein the first light beam and the second light beam intersect at an intersection area; (d) detecting a level of light from the first light beam and a level of light from the second light beam; and (e) determining, based on the level of light from the first light beam and the level of light from the second light beam, whether a droplet is deposited onto the substrate at a given location, wherein the droplet has a volume of about 1 µL or less. In some cases, the method further comprises when a droplet has not been deposited onto the substrate at the given location, actuating a dispenser to deposit a droplet onto the substrate at the given location.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system for measuring a droplet, said system comprising:
   (a) a plurality of first light sources arranged in an array; and
   (b) a plurality of second light sources arranged in an array; wherein a first light beam is emitted from a first light source of said plurality of first light sources and is configured to intersect with a second light beam emitted from a second light source of said plurality of second light sources at an intersection area at an intersection angle of about 90°;
   (c) a first detector configured to detect a level of light from said first light beam over a period of time;
   (d) a second detector configured to detect a level of light from said second light beam over a period of time;
   (e) a plurality of dispensers configured to dispense a plurality of droplets therefrom sequentially or concurrently along a droplet path, wherein said dispenser are arranged in a one-dimensional array or a two-dimensional array, and said droplet path passes through said intersection area; and
   (f) a processor operably coupled to said first or second detector, wherein said processor is configured to analyze: (i) an amount of light deflected from said first light beam as it passes through said intersection area; (ii) an amount of light deflected from said second light beam as it passes through said intersection area; or (iii) both; and (iv) combine information related to a level of light received from a plurality of first light beams and a plurality of second light beams,
   wherein said system is configured to measure a characteristic of said droplet as it passes through said intersection area.

2. The system of claim 1, wherein each first light source of said plurality of first light sources and each second light source of said plurality of second light sources are equidistant to each other.

3. The system of claim 1, wherein said plurality of first light sources are stationary and said second plurality of light sources is configured to be moved along an axis.

4. The system of claim 1, wherein said processor is configured to analyze said level of light from said first light beam and said level of light from said second light beam with respect to said period of time; wherein during said period of time, a plurality of droplets are dispensed from said plurality of dispensers; and wherein said level of light from said first light beam and said level of light from said second light beam are dependent on a presence or absence of a droplet of said plurality of droplets at said intersection area at a given time point.

5. The system of claim 1, wherein said processor is configured to determine a volume of a droplet based on said level of light from said first light beam and said level of light from said second light beam or on a speed of said droplet in said intersection area.

6. The system of claim 1, wherein said processor is configured to analyze a duration of time within which said level of light from said first light beam and said level of light from said second light beam are altered due to a presence of a droplet at said intersection area.

7. The system of claim 1, wherein said processor is configured to generate a feedback signal and controls a function of said plurality of dispensers based on said feedback signal.

8. The system of claim 7, wherein said function of said plurality of dispensers comprises a rate at which a droplet is dispensed, a volume of a droplet dispensed therefrom, or both.

9. The system of claim 7, wherein said feedback signal is determined based on a difference between a volume of said droplet dispensed from said plurality of dispensers and a desired volume of said droplet; and wherein a bubble is detected based on said difference.

10. The system of claim 7, wherein said system is configured to compensate for a missing droplet or an incorrect volume of a droplet based on said feedback signal.

11. The system of claim 1, wherein a droplet characteristic is determined based on a volume of said droplet, a shape of said droplet, a velocity of said droplet, or a combination thereof.

12. The system of any one of claim 1, further comprising (g) a substrate for receiving a droplet; and wherein a dispenser of said plurality of dispensers is configured to deposit a droplet onto said substrate at a desired location.

13. The system of claim 1, wherein said plurality of first light sources are configured to emit a plurality of first light beams concurrently.

14. The system of claim 1, wherein said first light beam and said second light beam have a wavelength from about 700 nm to about 1 mm.

15. The system of claim 1, wherein said first light beam and said second light beam comprises a beam sheet having a rectangular or a square shape, and a width in a range from about 10 μm to about 2500 μm.

16. The system of claim 1, wherein said first light beam and said second light beam comprises a beam spot having a diameter from about 10 μm to about 2500 μm.

17. The system of claim 1, wherein said intersection area is about 2 $mm^2$.

18. The system of claim 1, wherein said first and second detector comprises photo cells.

19. The system of claim 1, further comprising (h) an amplifier operably coupled to said first and second detectors configured to amplify a signal from said detectors.

20. The system of claim 1, further comprising (i) a reflector configured to direct said first light beam and said second light beam to said first detector and said second detector.

21. The system of claim 1, wherein said first light source of said plurality of first light sources and said second light source of said plurality of second light sources comprises a laser, retroreflective laser, or through laser.

22. The system of claim 1, wherein said system is configured to detect a presence of a droplet having a volume of 1 μL or less or a volume of 10 nL or less.

23. The system of claim 1, wherein said droplet comprises a reagent or a solution, biological material, or a cell.

24. The system of claim 1, wherein said system is configured to deposit from 1-1000 droplets onto said substrate in about 5 μs to about 1 s with an error rate of about 1-20%.

* * * * *